United States Patent
Arai et al.

(10) Patent No.: US 10,239,525 B2
(45) Date of Patent: Mar. 26, 2019

(54) DRIVING SUPPORT INFORMATION GENERATION DEVICE, DRIVING SUPPORT INFORMATION GENERATION METHOD, DRIVING SUPPORT DEVICE, AND DRIVING SUPPORT METHOD

(71) Applicant: MITSUBISHI ELECTRIC CORPORATION, Tokyo (JP)

(72) Inventors: Hirokazu Arai, Tokyo (JP); Mitsuo Shimotani, Tokyo (JP); Takehito Sogabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/543,927

(22) PCT Filed: Mar. 27, 2015

(86) PCT No.: PCT/JP2015/059652
§ 371 (c)(1),
(2) Date: Jul. 14, 2017

(87) PCT Pub. No.: WO2016/157304
PCT Pub. Date: Oct. 6, 2016

(65) Prior Publication Data
US 2017/0369056 A1   Dec. 28, 2017

(51) Int. Cl.
*B60W 30/095* (2012.01)
*G08G 1/09* (2006.01)
(Continued)

(52) U.S. Cl.
CPC ........ *B60W 30/0956* (2013.01); *B60W 40/09* (2013.01); *B60W 50/14* (2013.01);
(Continued)

(58) Field of Classification Search
CPC . G08G 1/01; G08G 1/096; G08G 1/09; B60K 28/06; B60W 30/095; B60Q 1/00; B61F 23/00; H04W 4/22
See application file for complete search history.

(56) References Cited

U.S. PATENT DOCUMENTS 6,262,657 B1 * 7/2001 Okuda ................. B60K 28/066
340/438
6,292,719 B1   9/2001 Seto et al.
(Continued)

FOREIGN PATENT DOCUMENTS

JP   10-132589 A   5/1998
JP   2000-351338 A   12/2000
(Continued)

*Primary Examiner* — Yuri Kan
(74) *Attorney, Agent, or Firm* — Birch, Stewart, Kolasch & Birch, LLP

(57) ABSTRACT

It is an object of the present invention to provide a driving support information generation device, a driving support information generation method, a driving support device, and a driving support method which make it possible to present effective caution information to drivers. The driving support information generation device of the present invention includes a processor to execute a program; and a memory to store the program which, when executed by the processor, performs processes of collecting vehicle information including traveling locus information indicating a traveling locus of at least one vehicle which travels a predetermined road section and generating cautionary information which is information to require a driver of the at least one vehicle to exercise caution when the at least one vehicle travels the section, on the basis of the collected vehicle information. The cautionary information is generated on the basis of variation in traveling of the vehicle.

20 Claims, 22 Drawing Sheets

(51) Int. Cl.

| | | |
|---|---|---|
| *B60Q 1/00* | (2006.01) | |
| *H04W 4/22* | (2009.01) | |
| *G08G 1/01* | (2006.01) | |
| *G08G 1/0969* | (2006.01) | |
| *B60W 40/09* | (2012.01) | |
| *B60W 50/14* | (2012.01) | |
| *G05D 1/02* | (2006.01) | |
| *G08G 1/0967* | (2006.01) | |
| *G08G 1/16* | (2006.01) | |
| *G01C 21/36* | (2006.01) | |

(52) U.S. Cl.
CPC ....... *G01C 21/3697* (2013.01); *G05D 1/0214* (2013.01); *G05D 1/0276* (2013.01); *G08G 1/01* (2013.01); *G08G 1/0112* (2013.01); *G08G 1/0969* (2013.01); *G08G 1/096716* (2013.01); *G08G 1/096725* (2013.01); *G08G 1/096775* (2013.01); *G08G 1/162* (2013.01); *B60W 2050/146* (2013.01); *B60W 2520/105* (2013.01); *B60W 2540/30* (2013.01); *B60W 2550/146* (2013.01); *B60W 2550/408* (2013.01); *B60W 2720/24* (2013.01); *G05D 2201/0213* (2013.01)

(56) References Cited

U.S. PATENT DOCUMENTS

| | | | |
|---|---|---|---|
| 6,487,475 | B1 | 11/2002 | Yoshikawa |
| 6,691,008 | B2* | 2/2004 | Kondo .................. B62D 1/28 180/40 |
| 7,831,314 | B2 | 11/2010 | Egami |
| 8,036,781 | B2 | 10/2011 | Egami |
| 9,373,257 | B2* | 6/2016 | Bonhomme ......... G08G 1/0967 |
| 2013/0059558 | A1* | 3/2013 | Gehlen ................ G08G 1/0965 455/404.1 |

FOREIGN PATENT DOCUMENTS

| | | |
|---|---|---|
| JP | 2001-4382 A | 1/2001 |
| JP | 2001-82966 A | 3/2001 |
| JP | 2002-116034 A | 4/2002 |
| JP | 2002-260191 A | 9/2002 |
| JP | 2003-99897 A | 4/2003 |
| JP | 2006-155000 A | 6/2006 |
| JP | 2008-287480 A | 11/2008 |
| JP | 2009-277059 A | 11/2009 |
| JP | 2010-113532 A | 5/2010 |
| JP | 2010-210489 A | 9/2010 |
| JP | 2010-230419 A | 10/2010 |
| JP | 2013-142978 A | 7/2013 |
| JP | 2014-194620 A | 10/2014 |

* cited by examiner

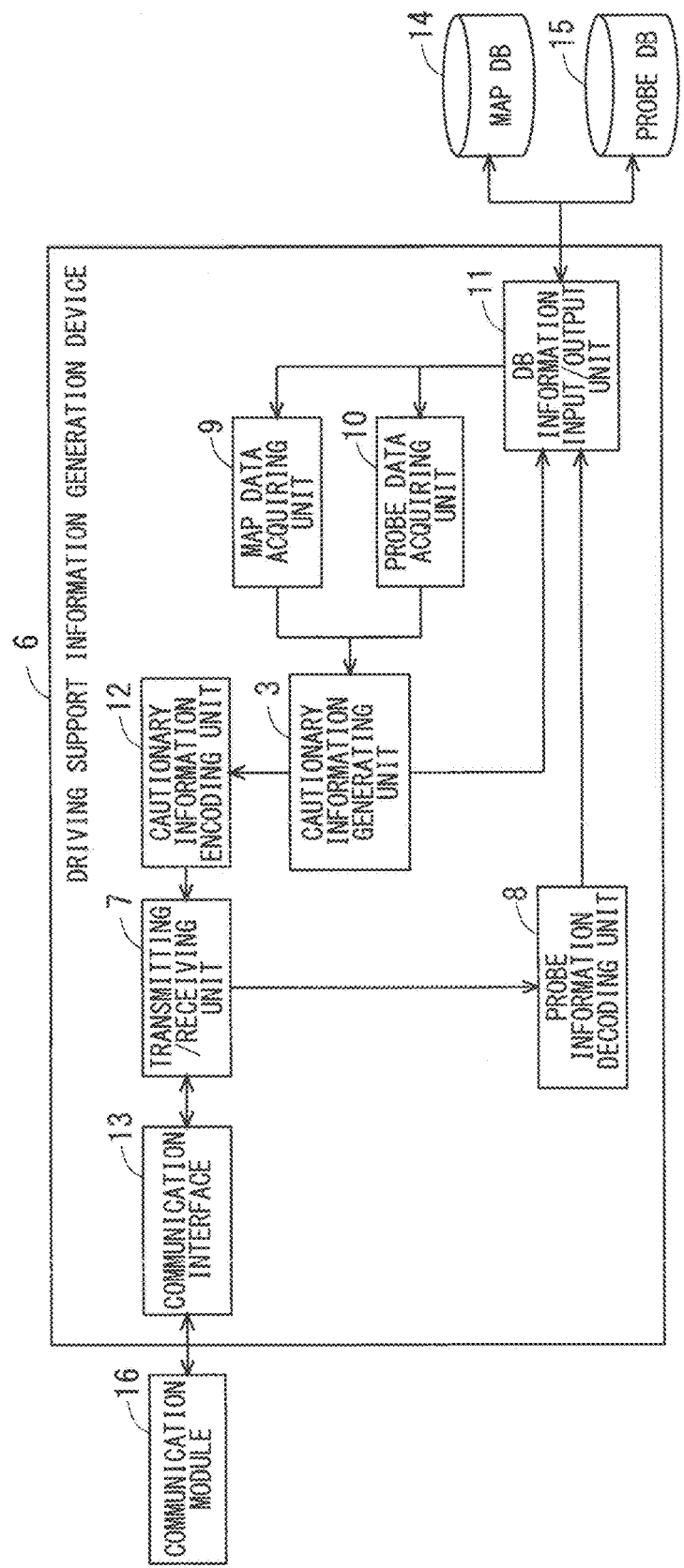
F I G. 3

| INFORMATION | PARAMETER |
|---|---|
| TRAVELING LOCUS | SET OF POSITION INFORMATION (LATITUDE [°], LONGITUDE [°], ALTITUDE [M]) INFORMATION OF CURVE, WHICH CAN BE REPRESENTED BY MATHEMATICAL EXPRESSION |
| STEERING | STEERING ANGLE [°] |
| VEHICLE SPEED | SPEED PER SECOND [M/S] |
| VEHICLE MODEL | MANUFACTURER (E.G., A COMPANY), VARIATION (E.G., PASSENGER CAR), STYLE (E.G., SUV), NAME (E.G., XXX) |

FIG. 6

```
SECTION [10000] {
  ROAD CONDITION
  PROBE INFORMATION [10000] {
    VEHICLE CONDITION (NORMAL OR POSSIBILITY OF FAILURE)
    DRIVER'S SKILL (LOW OR IMPROVED)
    TRAVELING LOCUS (SET OF POSITION INFORMATION)
    STEERING (STEERING ANGLE [°])
    VEHICLE SPEED (SPEED PER SECOND [M/S])
    VEHICLE MODEL (MANUFACTURER (E.G., A COMPANY), VARIATION (E.G., PASSENGER CAR),
    STYLE (E.G., SUV), NAME (E.G., XXX))
  }
}
```

F I G . 8
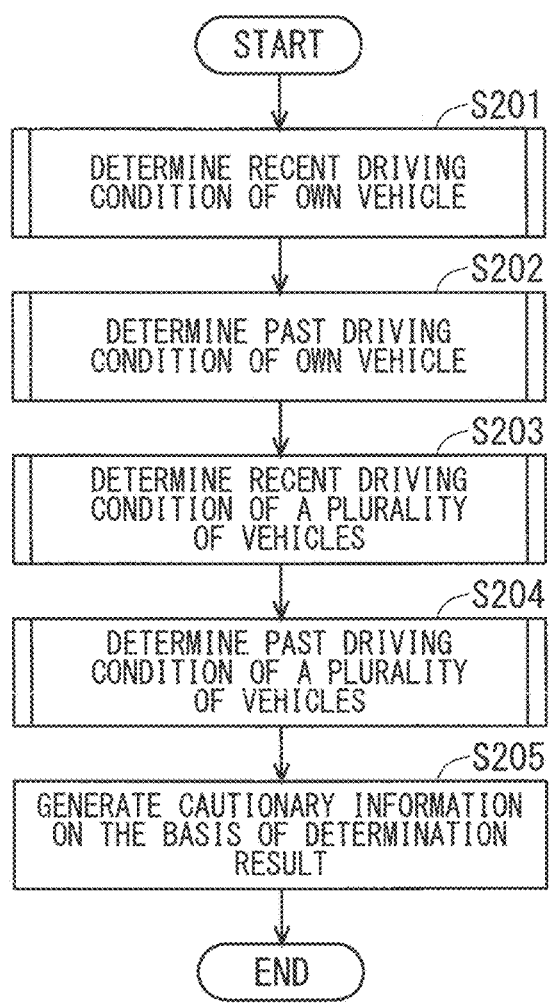

FIG. 11

| CAUTIONARY INFORMATION / DRIVING CONDITION | A | B | C | D |
|---|---|---|---|---|
| OWN VEHICLE HAS POSSIBILITY OF FAILURE | × | ○ | ○ | ○ |
| DRIVING SKILL OF DRIVER OF OWN VEHICLE HAS BEEN IMPROVED | ○ | × | ○ | ○ |
| DRIVING SKILL OF DRIVER OF OWN VEHICLE IS LOW | × | × | ○ | ○ |
| ROAD CONDITION HAS BEEN BAD CONTINUOUSLY FOR LONG TIME | × | × | × | × |
| ROAD CONDITION HAS BEEN DETERIORATED | × | ○ | × | ○ |
| ROAD CONDITION HAS BEEN IMPROVED | ○ | × | ○ | × |

FIG. 12

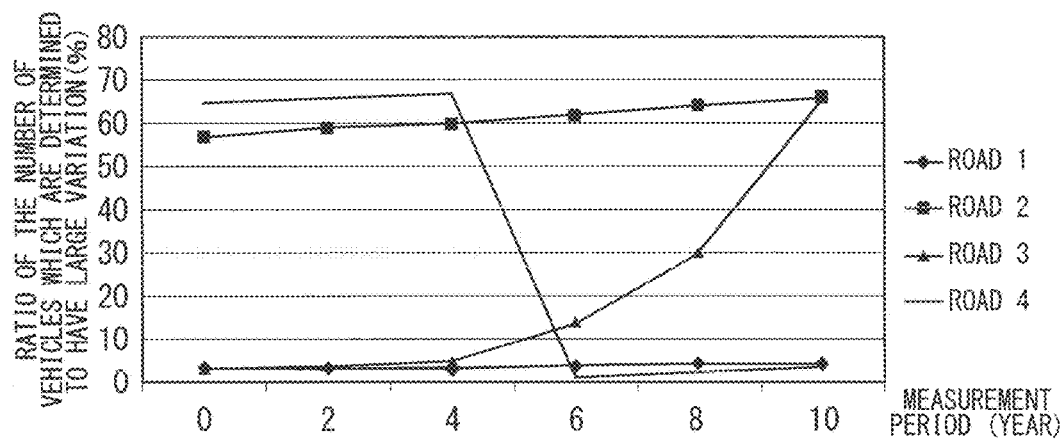

FIG. 13

| INFORMATION | PARAMETER |
|---|---|
| VEHICLE CONDITION | · NORMAL<br>· POSSIBILITY OF FAILURE |
| DRIVER'S SKILL | · LOW<br>· IMPROVED |
| ROAD CONDITION | · BAD CONTINUOUSLY FOR LONG TIME<br>· DETERIORATED<br>· IMPROVED |

F I G . 1 9
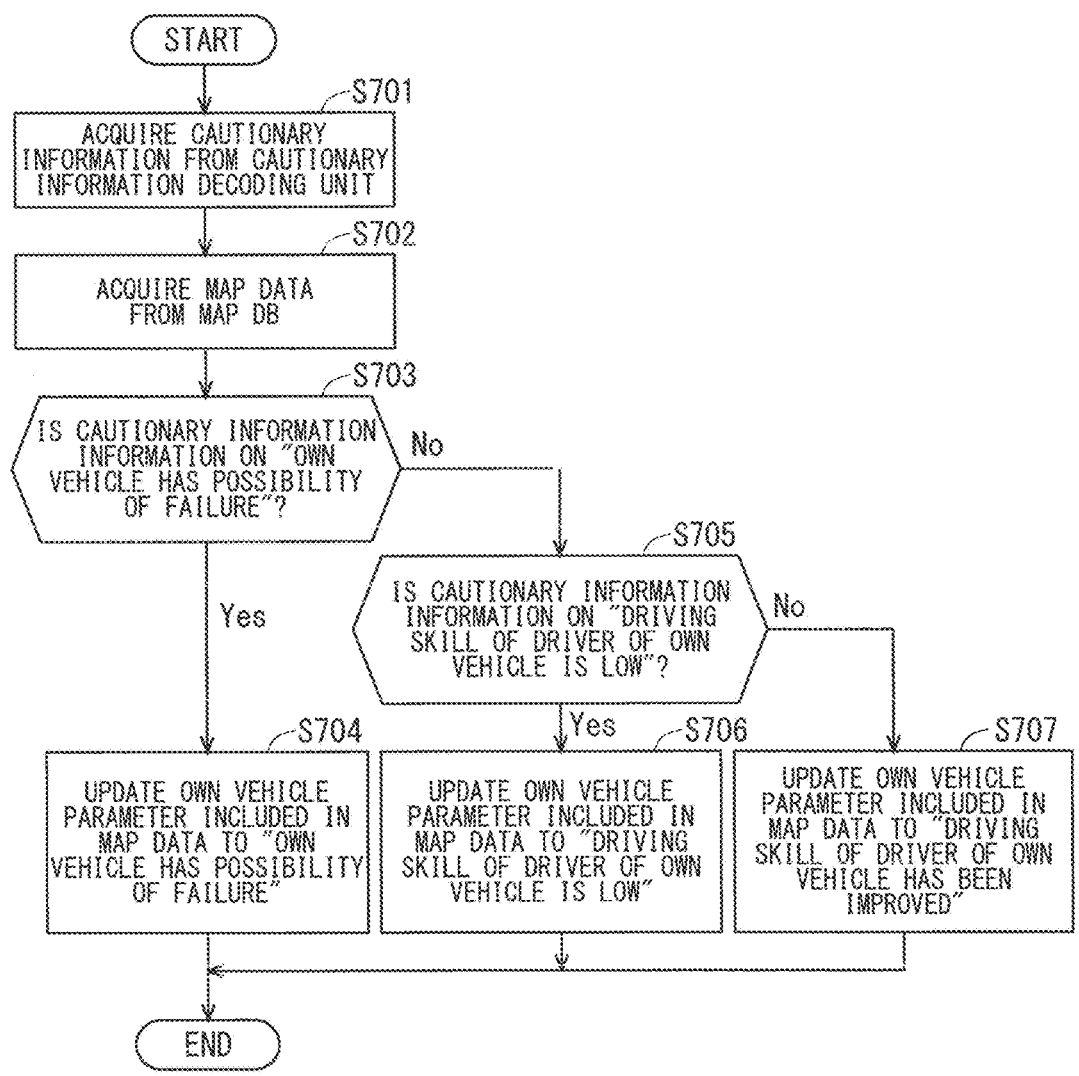

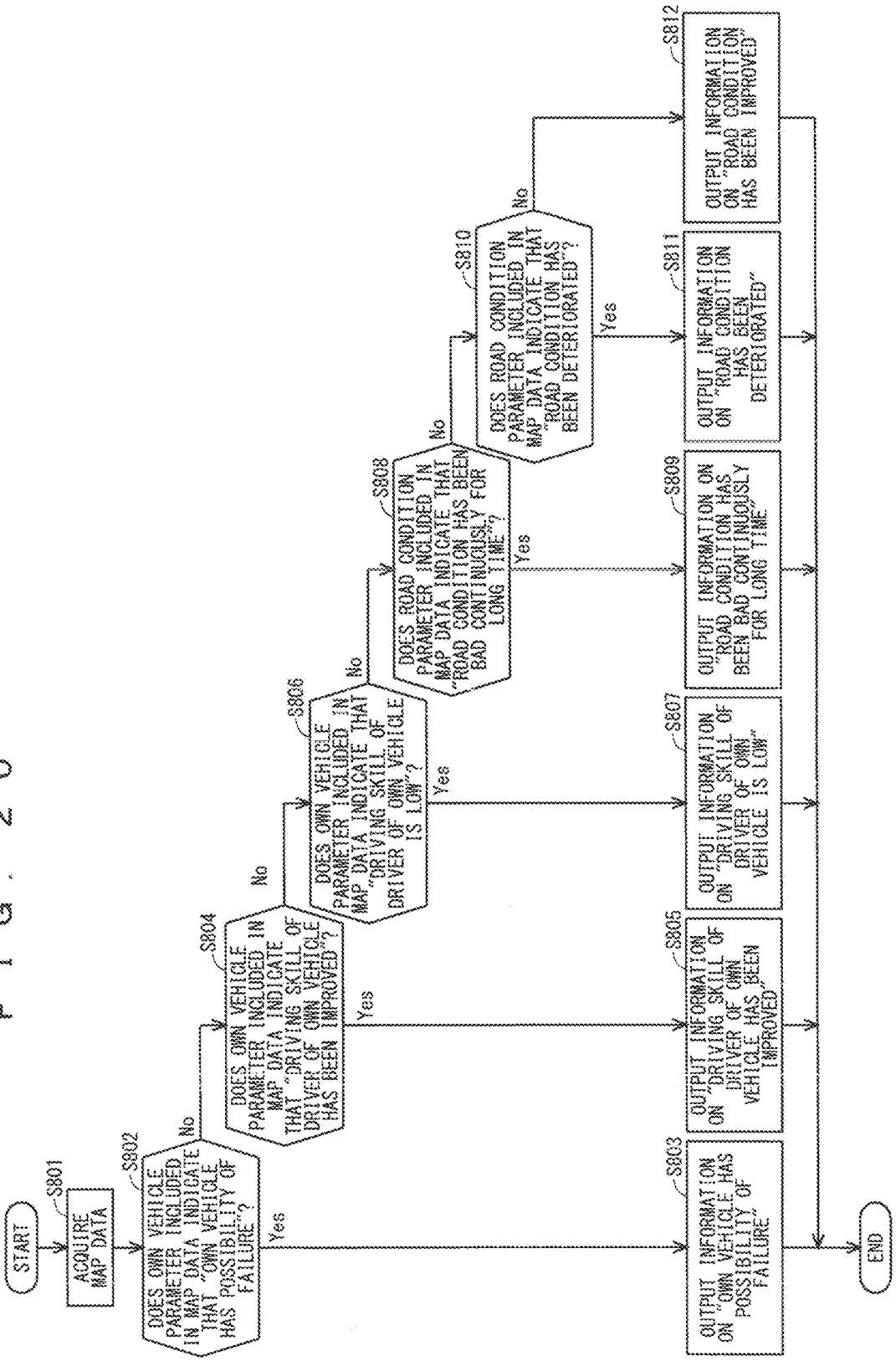

FIG. 29

```
SECTION[10000]{
  ROAD CONDITION
  PROBE INFORMATION[10000]{
    VEHICLE CONDITION (NORMAL OR POSSIBILITY OF FAILURE)
    DRIVER'S SKILL (LOW OR IMPROVED)
    TRAVELING LOCUS (SET OF POSITION INFORMATION)

ACCELERATION (X-AXIS [M/S$^2$], Y-AXIS [M/S$^2$], Z-AXIS [M/S$^2$])
    STEERING (STEERING ANGLE [°])
    VEHICLE SPEED (SPEED PER SECOND [M/S])
    REVERSE SIGNAL (FORWARD MOVEMENT OR BACKWARD MOVEMENT)
    VEHICLE MODEL (MANUFACTURER (E.G., A COMPANY), VARIATION (E.G., PASSENGER CAR),
    STYLE (E.G., SUV), NAME (E.G., XXX))
    ROAD SURFACE CONDITION (MANY PROJECTIONS AND DEPRESSIONS OR ROAD SURFACE IS
    FROZEN OR ROAD SURFACE IS WET)
  }
}
```

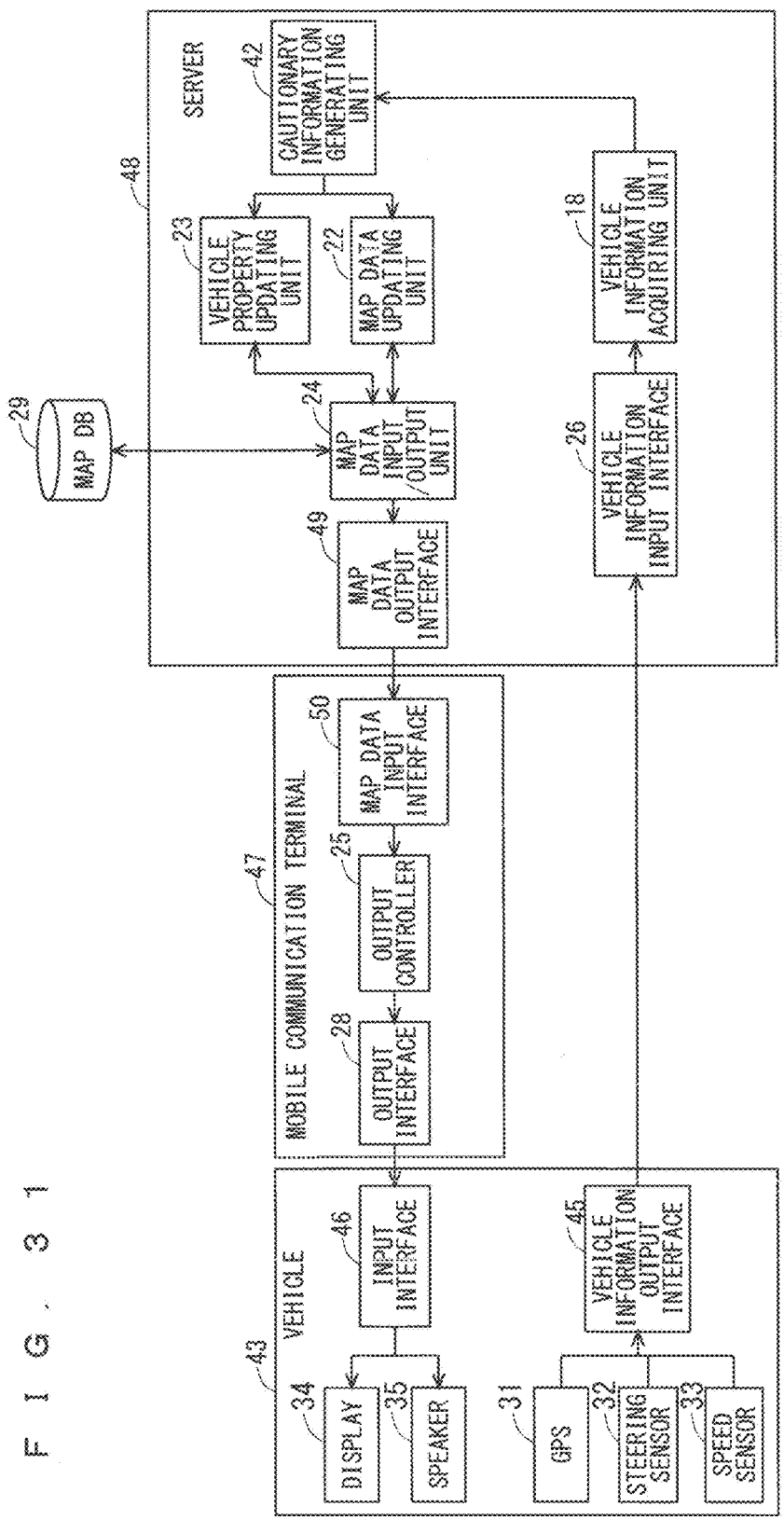

DRIVING SUPPORT INFORMATION GENERATION DEVICE, DRIVING SUPPORT INFORMATION GENERATION METHOD, DRIVING SUPPORT DEVICE, AND DRIVING SUPPORT METHOD

TECHNICAL FIELD

The present invention relates to a driving support information generation device and a driving support information generation method for generating information used to perform driving support and to a driving support device and a driving support method for performing driving support for drivers (people who drive vehicles) on the basis of the generated information.

BACKGROUND ART

Conventionally, there has been a technique to include curvature information of curves into a map Database (DB) and thereby present caution information to drivers before the drivers travel a curve having a large curvature, or a technique to present caution information to drivers on the basis of a relation between a travel speed and a curvature of a curve when caution is required to travel the curve.

Further, disclosed has been a technique to determine whether or not a road surface is slippery, on the basis of vehicle information, and present caution information to drivers when the road surface is slippery (see, for example, Patent Document 1).

PRIOR-ART DOCUMENTS

Patent Documents

[Patent Document 1] Japanese Patent Application Laid-Open No. 2008-287480

SUMMARY OF INVENTION

Problems to be Solved by the Invention

Actually, there are roads having shapes which cannot be represented by a simple semicircle or a simple function, such as mountain paths and the like, and roads having curvatures which are changed in mid-course. Further, the condition of a road is not uniform all in the course.

By the technique disclosed in Patent Document 1, it is possible to present caution information taking a temporary change in the condition of a road surface into consideration. The technique, however, does not make it possible to present effective caution information in accordance with the shape of a road or effective caution information taking a change with time of a road surface into consideration.

The present invention is intended to solve such a problem as above, and it is an object of the present invention to provide a driving support information generation device, a driving support information generation method, a driving support device, and a driving support method which make it possible to present effective caution information to drivers.

Means for Solving the Problems

To solve the above problem, the present invention is intended for a driving support information generation device. According to an aspect of the present invention, the driving support information generation device includes a processor to execute a program; and a memory to store the program which, when executed by the processor, performs processes of collecting vehicle information including traveling locus information indicating a traveling locus of at least one vehicle which travels a predetermined road section and generating cautionary information which is information to require a driver of the at least one vehicle to exercise caution when the at least one vehicle travels the section, on the basis of the collected vehicle information. The cautionary information is generated on the basis of variation in traveling of the at least one vehicle.

The present invention is also intended for a driving support information generation method. According to another aspect of the present invention, the driving support information generation method includes collecting vehicle information including traveling locus information indicating a traveling locus of a vehicle which travels a predetermined road section and generating cautionary information which is information to require a driver of the vehicle to exercise caution when the vehicle travels the section, on the basis of the vehicle information collected. The cautionary information is generated on the basis of variation in traveling of the vehicle.

Effects of the Invention

According to the present invention, since the driving support information generation device includes a processor to execute a program; and a memory to store the program which, when executed by the processor, performs processes of collecting vehicle information including traveling locus information indicating a traveling locus of at least one vehicle which travels a predetermined road section and generating cautionary information which is information to require a driver of the at least one vehicle to exercise caution when the at least one vehicle travels the section, on the basis of the collected vehicle information, the cautionary information being generated on the basis of variation in traveling of the at least one vehicle, it becomes possible to present effective caution information to drivers.

Further, since the driving support information generation method includes collecting vehicle information including traveling locus information indicating a traveling locus of a vehicle which travels a predetermined road section and generating cautionary information which is information to require a driver of the vehicle to exercise caution when the vehicle travels the section, on the basis of the vehicle information collected, the cautionary information being generated on the basis of variation in traveling of the at least one vehicle, it becomes possible to present effective caution information to drivers.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a block diagram showing an exemplary constitution of a driving support information generation device in accordance with the first preferred embodiment of the present invention;

FIG. 6 is a view showing an example of probe data in accordance with the first preferred embodiment of the present invention;

FIG. 8 is a flowchart showing an exemplary operation of a cautionary information generating unit in accordance with the first preferred embodiment of the present invention;

FIG. 11 is a view used for explaining determinations on cautionary information in accordance with the first preferred embodiment of the present invention;

FIG. 12 is a graph showing a ratio of the number of vehicles which are determined to have a large variation during a measurement period in accordance with the first preferred embodiment of the present invention;

FIG. 13 is a view showing an example of cautionary information in accordance with the first preferred embodiment of the present invention;

FIG. 19 is a flowchart showing an exemplary operation of a vehicle property updating unit in accordance with the first preferred embodiment of the present invention;

FIG. 20 is a flowchart showing an exemplary operation of an output controller in accordance with the first preferred embodiment of the present invention;

FIG. 29 is a view showing an example of probe data in accordance with a fourth preferred embodiment of the present invention;

FIG. 31 is a block diagram showing another exemplary constitution of the driving support system in accordance with the preferred embodiments of the present invention,

DESCRIPTION OF EMBODIMENT(S)

With reference to figures, the preferred embodiments of the present invention will be discussed below.

<The First Preferred Embodiment>

First, description will be made on a constitution of a driving support information generation device in accordance with the first preferred embodiment of the present invention.

Figure 1:
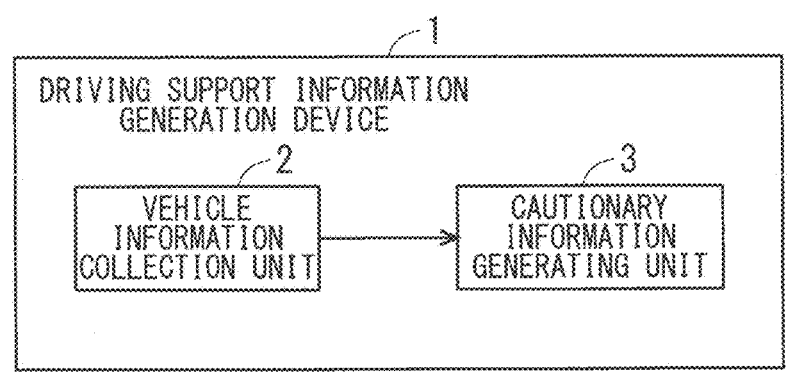
FIG. 1 is a block diagram showing an exemplary constitution of a driving support information generation device in accordance with a first preferred embodiment of the present invention.

FIG. 1 is a block diagram showing an exemplary constitution of a driving support information generation device 1 in accordance with the first preferred embodiment of the present invention. In FIG. 1, shown are minimum constituent elements constituting the driving support information generation device 1.

As shown in FIG. 1, the driving support information generation device 1 comprises at least a vehicle information collecting unit 2 and a cautionary information generating unit 3.

The vehicle information collecting unit 2 collects vehicle information including traveling locus information indicating a traveling locus of a vehicle which travels a predetermined road section.

The cautionary information generating unit 3 generates cautionary information which is information to require a driver of the vehicle to exercise caution when the vehicle travels the section, on the basis of the vehicle information collected by the vehicle information collecting unit 2.

Figure 2:
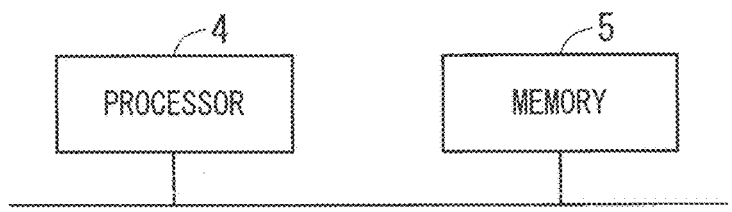
FIG. 2 is a view showing an exemplary constitution of hardware corresponding to software functions in the driving support information generation device in accordance with the first preferred embodiment of the present invention.

FIG. 2 is a view showing an exemplary constitution of hardware corresponding to software functions in the driving support information generation device 1.

The vehicle information collecting unit 2 and the cautionary information generating unit 3 are implemented as functions of a processor 4, for example, by causing the processor 4 to execute a program stored in a memory 5 or the like shown in FIG. 2. These constituent elements, however, may be implemented, for example, by cooperation of a plurality of processors 4.

Next, description will be made on another constitution of the driving support information generation device 1 including the vehicle information collecting unit 2 and the cautionary information generating unit 3 shown in FIG. 1

FIG. 3 is a block diagram showing an exemplary constitution of a driving support information generation device 6.

As shown in FIG. 3, the driving support information generation device 6 comprises a transmitting/receiving unit 7, a probe information decoding unit 8, a map data acquiring unit 9, a probe data acquiring unit 10, a DB information input/output unit 11, a cautionary information encoding unit 12, and a communication interface 13. The transmitting/receiving unit 7 is connected to a communication module 16 via the communication interface 13, and the DB information input/output unit 11 is connected to a map DB 14 and a probe DB 15.

Figures 4, 5:
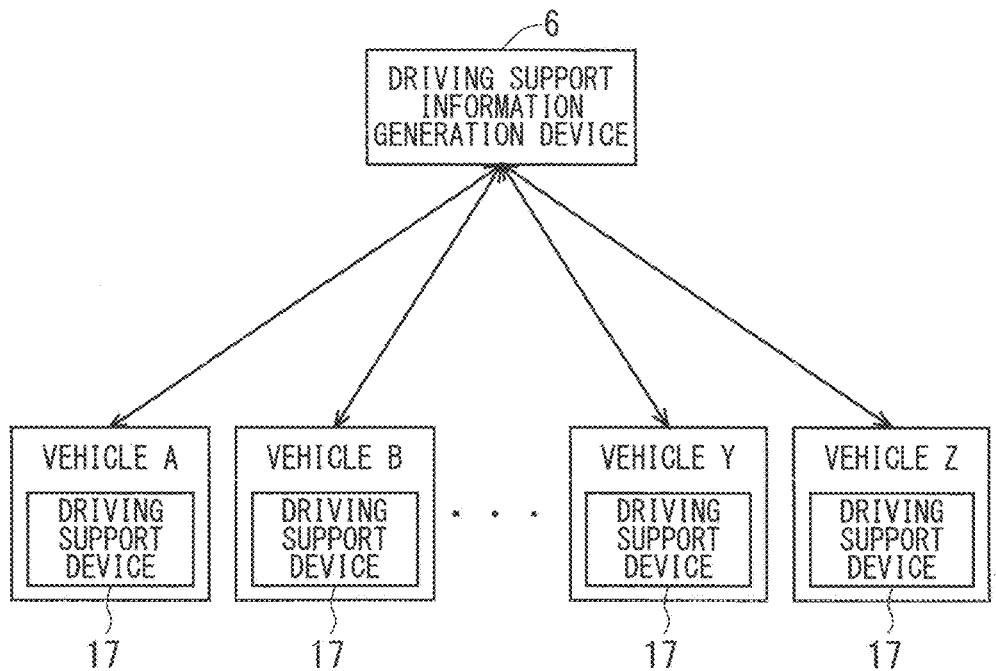
FIG. 4 is a view showing an exemplary relation between the driving support information generation device and a driving support device in accordance with the first preferred embodiment of the present invention.
FIG. 5 is a view showing an example of probe information in accordance with the first preferred embodiment of the present invention.

The transmitting/receiving unit 7 receives probe information from a driving support device 17 (see FIG. 15) described later via the communication interface 13 and the communication module 16. FIG. 4 is a view showing an exemplary relation between the driving support information generation device 6 and the driving support device 17. As shown in FIG. 4, the driving support information generation device 6 performs wireless communication with the driving support device 17 mounted on each vehicle. Specifically, the probe information is transmitted from each driving support device 17 to the driving support information generation device 6 and cautionary information is transmitted from the driving support information generation device 6 to each driving support device 17 (detailed description will be made later).

FIG. 5 is a view showing an example of the probe information. As shown in FIG. 5, the probe information includes information of a traveling locus, steering, a vehicle speed, and a vehicle model on traveling a target road section which is a target section of a road (detailed description will be made later). The target road section refers to a target section of a road for which cautioning is to be made to a driver. The target road section may be, for example, a section in which an increase of driving load is expected, such as a curve, a steep slope, and the like, or may be a section obtained by dividing a road by an arbitrary interval. Further, the transmitting/receiving unit 7 transmits the cautionary information generated by the cautionary information generating unit 3 to the driving support device 17 via the communication interface 13 and the communication module 16.

The probe information decoding unit 8 performs decoding of the probe information received by the transmitting/receiving unit 7 from the driving support device 17. The cautionary information encoding unit 12 performs encoding of the cautionary information generated by the cautionary information generating unit 3.

The Database (DB) information input/output unit 1.1 inputs and/or outputs map data from/to the map Database (DB) 14 and inputs and/or outputs probe data from/to the probe Database (DB) 15.

The map data acquiring unit 9 acquires the map data from the map DB 14 through the DB information input/output unit 11. The probe data acquiring unit 10 acquires the probe data from the probe DB 15 through the DB information input/output unit 11

The cautionary information generating unit 3 generates the cautionary information on the basis of the map data acquired by the map data acquiring unit 9 and the probe data acquired by the probe data acquiring unit 10.

The probe DB 15 is formed of, for example, a memory device such as a hard disk drive (HDD), a semiconductor memory, or the like, and stores therein the probe data. FIG. 6 is a view showing an example of the probe data. As shown in FIG. 6, the probe data includes a road condition and the probe information. Further, the probe information includes a vehicle condition, a driver's skill, a traveling locus, steering, a vehicle speed, and a vehicle model. In the probe DB 15, accumulated are probe data on driving support devices 17. In this case, the probe DB 15 may accumulate the probe data for each vehicle model. The probe data will be described in detail.

The map DB 14 is formed of a memory device such as a hard disk drive (HDD), a semiconductor memory, or the like, and stores therein the map data. The communication module 16 performs communication with the driving support device 17. As the communication module 16, for example, used is a communication terminal such as a cellular phone or the like.

Further, the cautionary information generating unit 3, the transmitting/receiving unit 7, the probe information decoding unit 8, the map data acquiring unit 9, the probe data acquiring unit 10, and the DB information input/output unit 11, and the cautionary information encoding unit 12 are implemented as functions of the processor 4, for example, by causing the processor 4 to execute a program stored in the memory 5 or the like shown in FIG. 2. These constituent elements, however, may be implemented, for example, by cooperation of a plurality of processors 4.

Furthermore, the transmitting/receiving unit 7, the probe information decoding unit 8, and the DB information input/output unit 11 shown in FIG. 3 correspond to the vehicle information collecting unit 2 shown in FIG. 1, and the vehicle information collected by the vehicle information collecting unit 2 corresponds to the probe information received by the transmitting/receiving unit 7 from the driving support device 17.

Next, an operation of the driving support information generation device 6 in accordance with the first preferred embodiment will be described.

Figure 7:
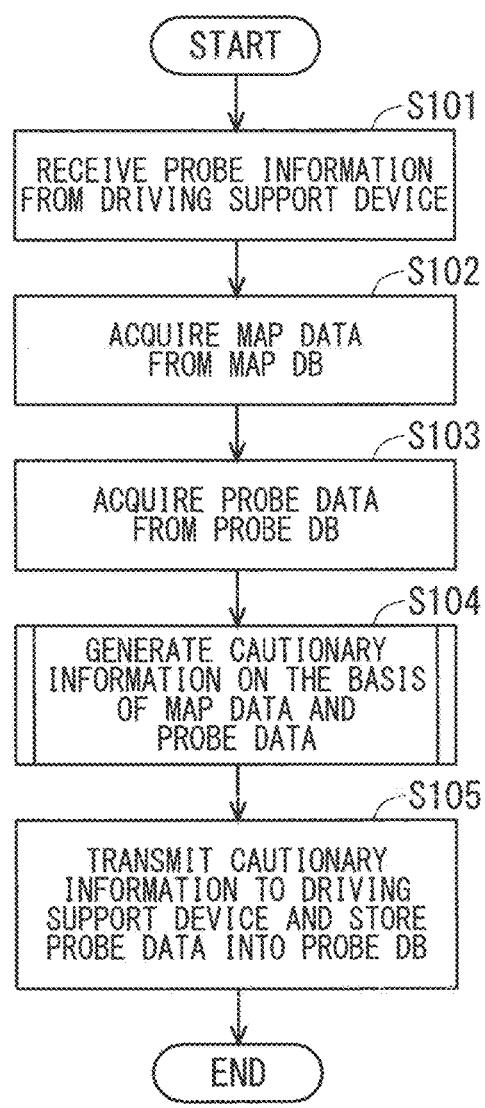
FIG. 7 is a flowchart showing an exemplary operation of the driving support information generation device in accordance with the first preferred embodiment of the present invention.

FIG. 7 is a flowchart showing an exemplary operation of the driving support information generation device 6. Step S101 indicates an operation of receiving the probe information from the driving support device 17, and Steps 5102 to 5105 indicate an operation of generating the cautionary information.

In Step S101, the transmitting/receiving unit 7 receives the probe information of the target road section from the driving support device 17 via the communication interface 13 and the communication module 16. The target road section may be specified, for example, on the basis of a set of position information included in the probe information, or may be specified on the basis of information for identifying each section. In a case where the target road section is specified on the basis of the information for identifying each section, it is assumed that the information for identifying ach section is included in the probe information. The probe information received by the transmitting/receiving unit 7 is decoded by the probe information decoding unit 8, and then stored into the probe DB 15 as the probe data. At that time, the probe data does not include the road condition, the vehicle condition, or the driver's skill shown in FIG. 6.

In Step S102, the map data acquiring unit 9 acquires map information of the target road section from the map DB 14 through the DB information input/output unit 11.

In Step S103, the probe data acquiring unit 10 acquires the probe data of the target road section from the probe DB 15 through the DB information input/output unit 11. Specifically, the probe data acquiring unit 10 acquires the probe data of the target road section on each driving support device 17 from the probe DB 15. At that time, the latest probe data does not include the road condition, the vehicle condition, or the driver's skill shown in FIG. 6.

In Step S104, the cautionary information generating unit 3 generates the cautionary information on the basis of the map data acquired by the map data acquiring unit 9 and the probe data acquired by the probe data acquiring unit 10.

In Step S105, the cautionary information generated by the cautionary information generating unit 3 is encoded by the cautionary information encoding unit 12, and then transmitted to the driving support device 17 via the transmitting/receiving unit 7, the communication interface 13, and the communication module 16. Further, the cautionary information generated by the cautionary information generating unit 3 is included into the latest probe data and then stored into the probe DB 15. In other words, this probe data is the probe data shown in the exemplary case of FIG. 6.

Figure 9:
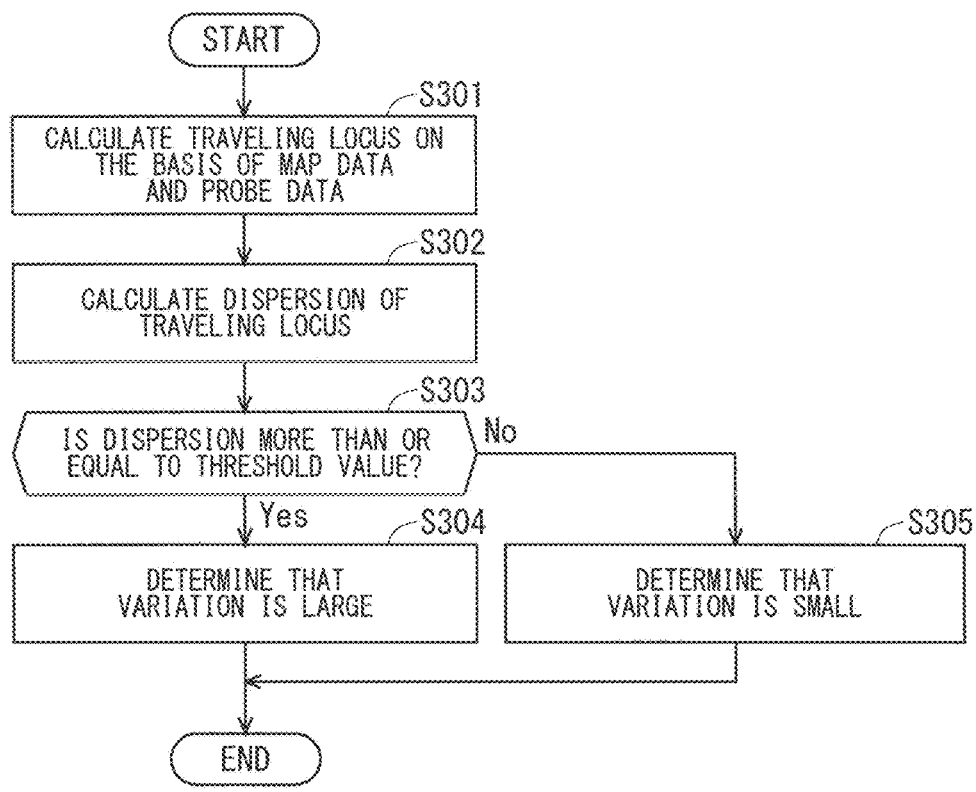
FIG. 9 is a flowchart showing an exemplary operation of the cautionary information generating unit in accordance with the first preferred embodiment of the present invention.

Next, a detailed operation of Step S104 will be described with reference to FIGS. 8 and 9.

FIG. 8 is a flowchart showing an exemplary operation of the cautionary information generating unit 3.

In Step S201, the cautionary information generating unit 3 determines a recent driving condition of an own vehicle.

In Step S202, the cautionary information generating unit 3 determines a past driving condition of the own vehicle.

In Step S203, the cautionary information generating unit 3 determines recent driving conditions of a plurality of vehicles.

In Step S204, the cautionary information generating unit 3 determines past driving conditions of the plurality of vehicles.

Herein, a detailed operation in each of Steps S201 to S204 of FIG. 8 will be described with reference to FIG. 9.

In Step S301, the cautionary information generating unit 3 calculates a traveling locus in the target road section on the basis of the map data acquired by the map data acquiring unit 9 and the probe data acquired by the probe data acquiring unit 10. Specifically, the cautionary information generating unit 3 specifies the target road section and calculates the traveling locus in the target road section on the basis of the map data and a plurality of pieces of position information constituting the traveling locus, which are included in the probe data. The traveling locus can be calculated by using a set of a plurality of pieces of position information constituting the traveling locus.

In a case where Step S301 is a process in Step S201 of FIG. 8, the probe data acquiring unit 10 acquires the recent probe data of the own vehicle. In a case where Step S301 is a process in Step S202 of FIG. 8, the probe data acquiring unit 10 acquires the past probe data of the own vehicle. In a case where Step S301 is a process in Step S203 of FIG. 8, the probe data acquiring unit 10 acquires the recent probe data of a plurality of vehicles. In a case where Step S301 is a process in Step S204 of FIG. 8, the probe data acquiring unit 10 acquires the past probe data of the plurality of vehicles.

Further, the probe data of the own vehicle is probe data at the time when the own vehicle travels the target road section a plurality of times. Furthermore, the probe data of a plurality of vehicles may be probe data at the time when each vehicle travels the target road section only once, or may be probe data at the time when each vehicle travels the target road section a plurality of times, or the two types of probe data may be mixed.

Herein, the recent probe data refers to, for example, probe data generated on the basis of the probe information received from the driving support device 17 within the last one month. Further, the past probe data refers to, for example, probe data generated on the basis of the probe information received from the driving support device 17 within the past six months.

In Step S302, the cautionary information generating unit 3 calculates dispersion of the traveling locus. Further, not limited to calculation of the dispersion, the cautionary information generating unit 3 may calculate an index to be used in a statistical method, such as standard deviation or the like.

In Step S303, the cautionary information generating unit 3 determines whether the dispersion calculated in Step S302 is more than or equal to a threshold value. When the dispersion is more than or equal to the threshold value, the process goes to Step S304. On the other hand, when the dispersion is not more than or equal to the threshold value (when the dispersion is smaller than the threshold value), the process goes to Step S305.

In Step S304, the cautionary information generating unit 3 determines that the variation in the traveling locus is large.

In Step S305, the cautionary information generating unit 3 determines that the variation in the traveling locus is small.

Figure 10:
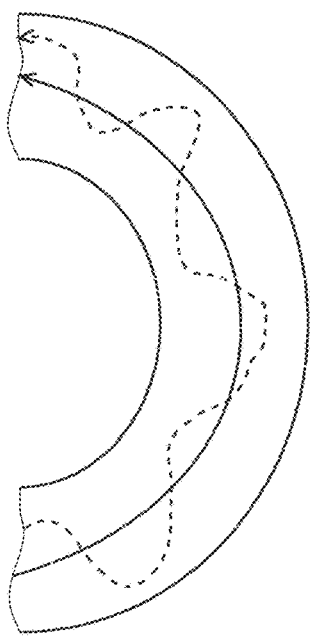
FIG. 10 is a view showing an example of a degree of variation in traveling locus in a case where a vehicle travels a curve in accordance with the first preferred embodiment of the present invention.

FIG. 10 is a view showing an example of a degree of variation in the traveling locus in a case where a vehicle travels a curve. In FIG. 10, the broken line indicates that the variation in the traveling locus is large, and the solid line indicates that the variation in the traveling locus is small.

With reference back to FIG. 8, in Step S205, the cautionary information generating unit 3 generates the cautionary information on the basis of the determination results in Steps S201 to S204. Specifically, the cautionary information generating unit 3 generates the cautionary information on the basis of the following A to D.

A: The recent driving condition of the own vehicle (the degree of variation in the traveling locus)

B: The past driving condition of the own vehicle (the degree of variation in the traveling locus)

C: The recent driving condition of a plurality of vehicles (the degree of variation in the traveling locus)

D: The past driving condition of the plurality of vehicles (the degree of variation in the traveling locus)

FIG. 11 is a view used for explaining determinations of the cautionary information performed by the cautionary information generating unit 3. In FIG. 11, reference signs A to D correspond to the respective driving conditions of above A to D. Further, "○" indicates that the variation is small, and "X" indicates that the variation is large.

The cautionary information generating unit 3 generates any one of "the own vehicle has a possibility of failure", "the driving skill of the driver of the own vehicle has been improved", "the driving skill of the driver of the own vehicle is low", "the road condition has been bad continuously for a long time", "the road condition has been deteriorated", and "the road condition has been improved", as the cautionary information, on the basis of combination of the respective driving conditions of A to D shown in FIG. 11.

For example, in a case where the variations in the recent and past traveling loci of a plurality of vehicles are small, the variation in the past traveling locus of the own vehicle is small, and the variation in the recent traveling locus of the own vehicle is large (in other words, in a case where the change with time of the degree of variation in the traveling locus only of the own vehicle becomes larger), the cautionary information generating unit 3 generates "the own vehicle has a possibility of failure" as the cautionary information. Further, in a case where the variations in the past traveling loci of a plurality of vehicles and the own vehicle are small and the variations in the recent traveling loci of the plurality of vehicles and the own vehicle are large (in other words, in a case where the change with time of the degree of variation in the traveling locus of each vehicle becomes larger), the cautionary information generating unit 3 generates "the road condition has been deteriorated" as the cautionary information.

Further, the determination of the road condition may be performed on the basis of a ratio of the number of vehicles which are determined above to have a large variation. FIG. 12 is a graph showing a ratio of the number of vehicles which are determined to have a large variation during a measurement period. Herein, as to the measurement period, "recent" is used, for example, for a period within the latest four years. Further, as to the measurement period, "past" is used, for example, for a period within the past ten years.

In FIG. 12, as to the road 1, it is shown that the road condition thereof is always good during the measurement period. As to the road 2, it is shown that the road condition thereof is always bad during the measurement period. As to the road 3, it is shown that the road condition thereof is being deteriorated during the measurement period. As to the road 4, it is shown that the road condition thereof is being improved during the measurement period.

The ratio of the number of vehicles which are determined to have a large variation is calculated, for example, by using the following equation (1).

$$\text{The ratio (\%) of the number of vehicles which are determined to have a large variation} = \text{(the number of vehicles which are determined to have a large variation)} / \text{(the number of vehicles which are traveling the target road section)} \times 100 \quad (1)$$

FIG. 13 is a view showing an example of the cautionary information.

As shown in FIG. 13, the cautionary information includes information on the vehicle condition, information on the driver's skill, and information on the road condition. The information on the vehicle condition includes either one of parameters indicating "normal" and "possibility of failure". The information on the driver's skill includes either one of parameters indicating "low" and "improved". The information on the road condition includes any one of parameters indicating "bad continuously for a long time", "deteriorated", and "improved". Further, though not shown, the cautionary information includes information on the target road section.

The generation of the cautionary information by the cautionary information generating unit 3 is performed at a timing when a certain amount of probe data are collected from the driving support devices 17. The timing may be, for example, once every day.

The driving support information generation device 6 may transmit the cautionary information to the driving support device 17 every time when the cautionary information is generated, or may transmit the cautionary information in response to a request from the driving support device 17.

Though the cautionary information is generated on the basis of the combination of the driving conditions shown in FIG. 11 in the first preferred embodiment, this is only one exemplary case.

Figure 14:
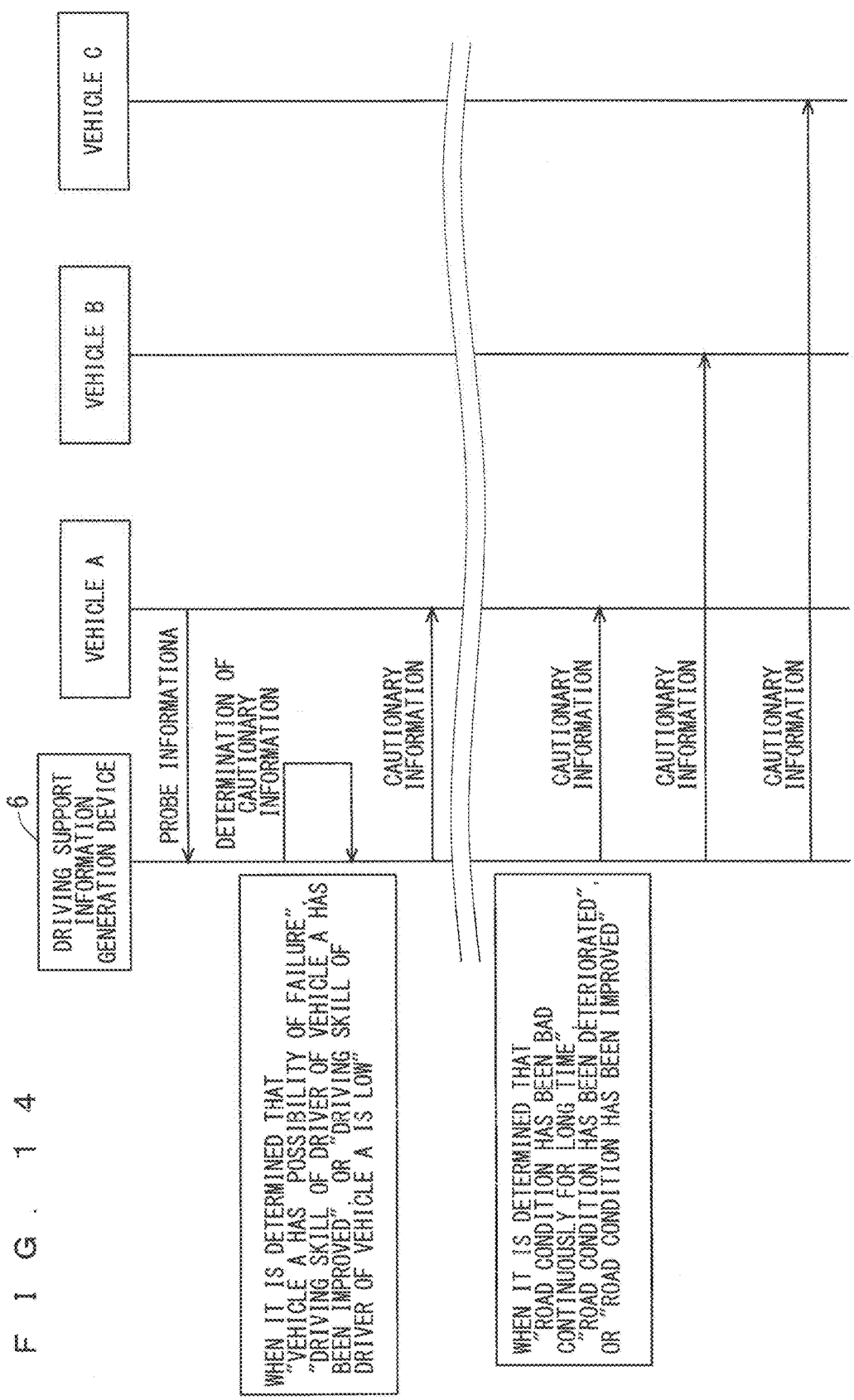
FIG. 14 is a view showing an exemplary communication between the driving support information generation device and the driving support device mounted on each vehicle in accordance with the first preferred embodiment of the present invention.

FIG. 14 is a view showing an exemplary communication between the driving support information generation device 6 and the driving support device 17 (not shown) mounted on each of vehicles (vehicles A to C).

As shown in FIG. 14, for example, when the driving support information generation device 6 acquires the probe information from the vehicle A, the driving support information generation device 6 performs determination of the cautionary information from the driving condition in the target road section (see FIG. 11). Then, when it is determined that the cautionary information indicates that "the vehicle A has a possibility of failure", "the driving skill of the driver of the vehicle A has been improved", or "the driving skill of the driver of the vehicle A is low", the driving support information generation device 6 transmits the cautionary information to the vehicle A. On the other hand, when it is determined that the cautionary information indicates that "the road condition has been bad continuously for a long time", "the road condition has been deteriorated", or "the road condition has been improved", the driving support information generation device 6 transmits the cautionary information to all the vehicles (the vehicles A to C).

Next, a constitution of the driving support device in accordance with the first preferred embodiment will be described.

Figure 15:
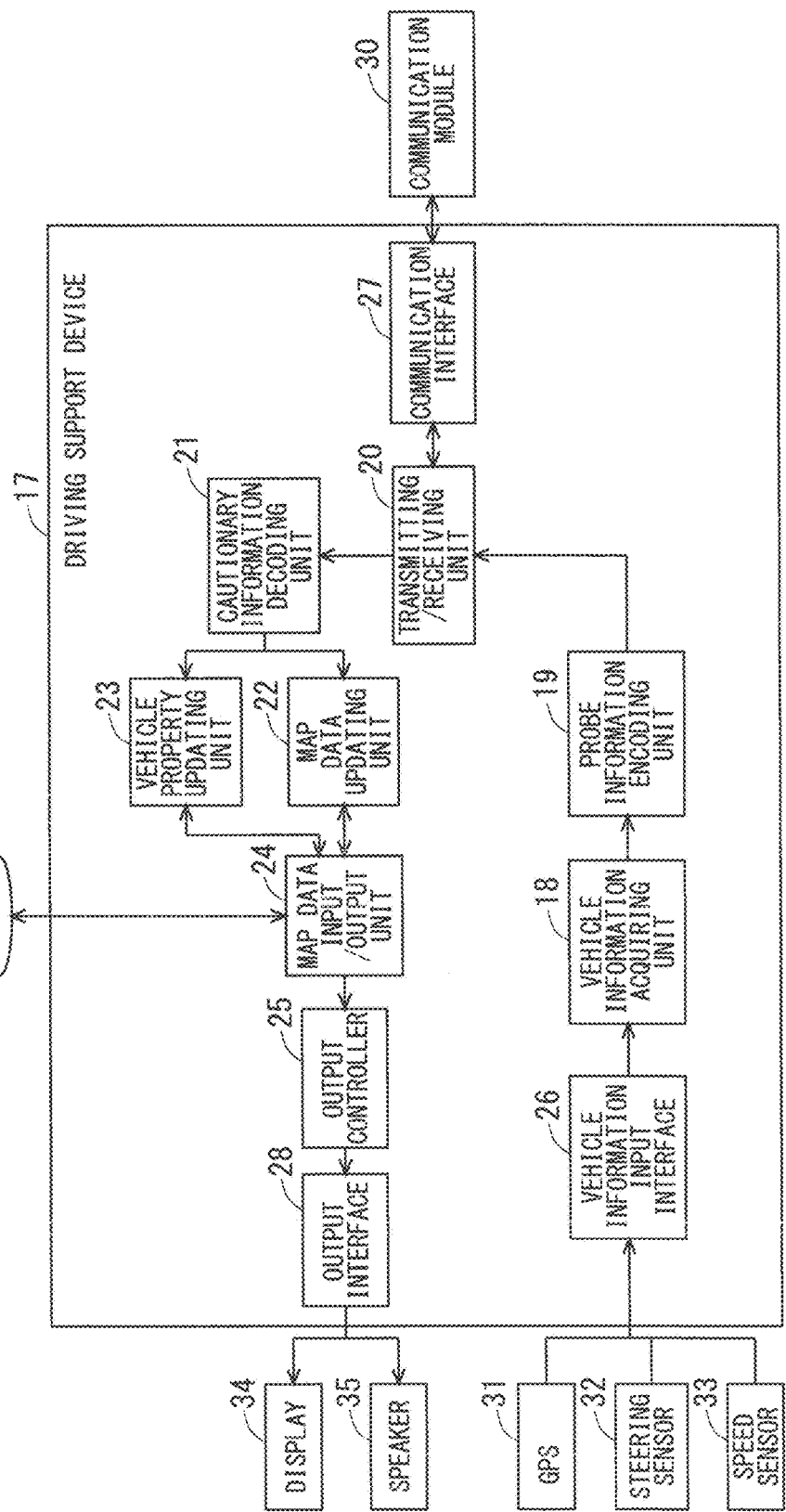
FIG. 15 is a block diagram showing an exemplary constitution of the driving support device in accordance with the first preferred embodiment of the present invention.

FIG. 15 is a block diagram showing an exemplary constitution of the driving support device 17. Further, the driving support device 17 is mounted on a vehicle as shown in FIG. 4. Hereinafter, description will be made on one driving support device 17.

As shown in FIG. 15, the driving support device 17 comprises a vehicle information acquiring unit 18, a probe information encoding unit 19, a transmitting/receiving unit 20, a cautionary information decoding unit 21, a map data updating unit 22, a vehicle property updating unit 23, a map data input/output unit 24, an output controller 25, a vehicle information input interface 26, a communication interface 27, and an output interface 28. The vehicle information acquiring unit 18 is connected to a Global Positioning System (GPS) 31, a steering sensor 32, and a speed sensor 33 via the vehicle information input interface 26. The transmitting/receiving unit 20 is connected to a communication module 30 via the communication interface 27. The map data input/output unit 24 is connected to a map DB 29 via the map data input/output unit 24. The output controller 25 is connected to a display 34 and a speaker 35 via the output interface 28.

The vehicle information acquiring unit 18 acquires position information (latitude, longitude, and altitude) of the vehicle from the GPS 31 via the vehicle information input interface 26, acquires information on a steering angle of the vehicle from the steering sensor 32, and acquires information on a speed of the vehicle from the speed sensor 33. Then, the vehicle information acquiring unit 18 gathers these acquired information into the probe information (see FIG. 5). Further, it is assumed that the GPS 31, the steering sensor 32, and the speed sensor 33 are provided in the vehicle.

The probe information encoding unit 19 performs encoding of the probe information acquired by the vehicle information acquiring unit 18.

The transmitting/receiving unit 20 transmits the probe information encoded by the probe information encoding unit 19 to the driving support information generation device 6 (see FIG. 3) via the communication interface 27 and the communication module 30. Further, the transmitting/receiving unit 20 receives the cautionary information from the driving support information generation device 6 via the communication interface 27 and the communication module 30.

The cautionary information decoding unit 21 performs decoding of the cautionary information received by the transmitting/receiving unit 20 from the driving support information generation device 6.

The map data updating unit 22 updates the map data on the basis of the cautionary information. The vehicle property updating unit 23 updates a vehicle property on the basis of the cautionary information.

The map data input/output unit 24 inputs and/or outputs the map data from/to the map DB 29. Further, the map data input/output unit 24 outputs the map data to the output controller 25.

On the basis of the map data inputted from the map data input/output unit 24, the output controller 25 outputs information for making cautioning to the driver, to the display 34 and the speaker 35 via the output interface 28. The display 34 and the speaker 35 are mounted on the vehicle.

The map DB 29 is formed of a memory device such as a hard disk drive (HDD), a semiconductor memory, or the like, and stores therein the map data. The communication module 30 performs communication with the driving support information generation device 6. As the communication module 30, for example, used is a communication terminal such as a cellular phone or the like.

Further, hardware constitution corresponding to the software functions in the driving support device 17 is the same as that of the driving support information generation device 1. Specifically, the vehicle information acquiring unit 18, the probe information encoding unit 19, the transmitting/receiving unit 20, the cautionary information decoding unit 21, the map data updating unit 22, the vehicle property updating unit 23, the map data input/output unit 24, and the output controller 25 are implemented as functions of the processor 4, for example, by causing the processor 4 to execute a program stored in the memory 5 or the like shown in FIG. 2. These constituent elements, however, may be implemented, for example, by cooperation of a plurality of processors 4.

In FIG. 15, the transmitting/receiving unit 20 has a function as a cautionary information acquiring unit for acquiring the cautionary information from the driving support information generation device 6. Further, the output controller 25 has a function as a cautioning unit for making cautioning to the driver of the vehicle on the basis of the cautionary information.

Next, an operation of the driving support device 17 in accordance with the first preferred embodiment will be described.

Figure 16:
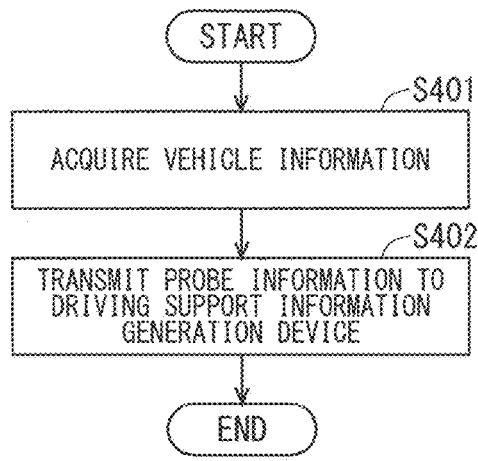
FIG. 16 is a flowchart showing an exemplary operation of the driving support device in accordance with the first preferred embodiment of the present invention.

FIG. 16 is a flowchart showing an exemplary operation of the driving support device 17, which shows an operation of transmitting the probe information to the driving support information generation device 6.

In Step S401, the vehicle information acquiring unit 18 acquires the respective information from the GPS 31, the steering sensor 32, and the speed sensor 33 via the vehicle information input interface 26 and gathers these information into the probe information. The probe information is encoded by the probe information encoding unit 19.

In Step S402, the transmitting/receiving unit 20 transmits the probe information encoded by the probe information encoding unit 19 to the driving support information generation device 6 via the communication interface 27 and the communication module 30.

Figure 17:
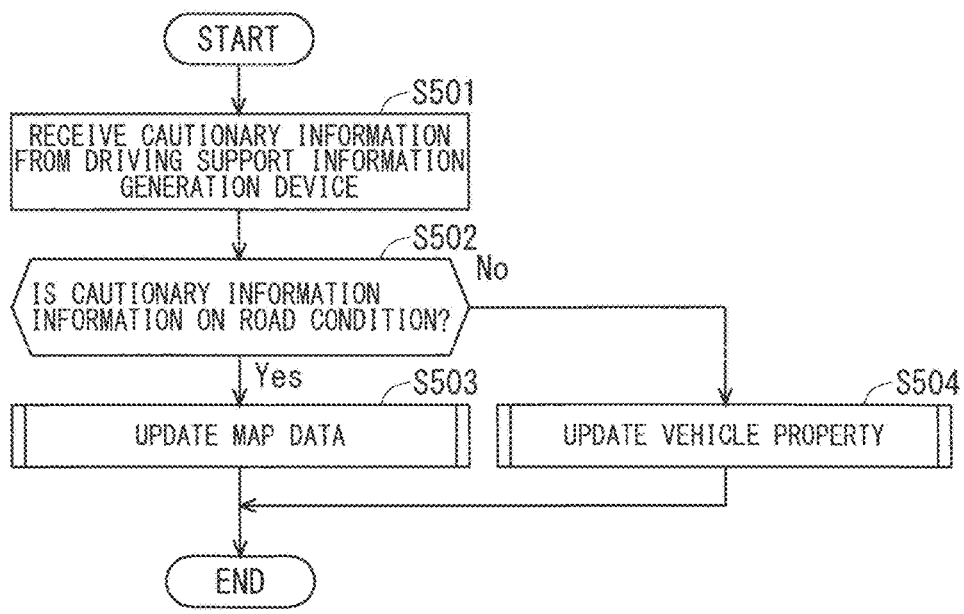
FIG. 17 is a flowchart showing an exemplary operation of the driving support device in accordance with the first preferred embodiment of the present invention.

FIG. 17 is a flowchart showing the operation of the driving support device 17, which shows an operation after the cautionary information is received from the driving support information generation device 6.

In Step S501, the transmitting/receiving unit 20 receives the cautionary information from the driving support information generation device 6 via the communication interface 27 and the communication module 30. The received cautionary information is decoded by the cautionary information decoding unit 21.

In Step S502, the cautionary information decoding unit 21 determines whether or not the cautionary information is information on the road condition. When the cautionary information is the information on the road condition, the process goes to Step S503. On the other hand, when the cautionary information is not the information on the road condition, the cautionary information decoding unit 21 determines that the cautionary information is information on the vehicle property, and the process goes to Step S504. Herein, the information on the vehicle property includes the information on the vehicle condition and the information on the driver's skill (see FIG. 13).

In Step S503, the map data updating unit 22 updates the map data. Specifically, the map data updating unit 22 updates a road condition parameter included in the map data stored in the map DB 29 (detailed description will be made later). Further, the road condition parameter corresponds to the parameter included in the information on the road condition shown in FIG. 13.

In Step S504, the vehicle property updating unit 23 updates the vehicle property. Specifically, the vehicle property updating unit 23 updates an own vehicle parameter included in the map data stored in the map DB 29 (detailed description will be made later). Further, the own vehicle parameter corresponds to the parameter included in each of the information on the vehicle condition and the information on the driver's skill shown in FIG. 13.

Figure 18:
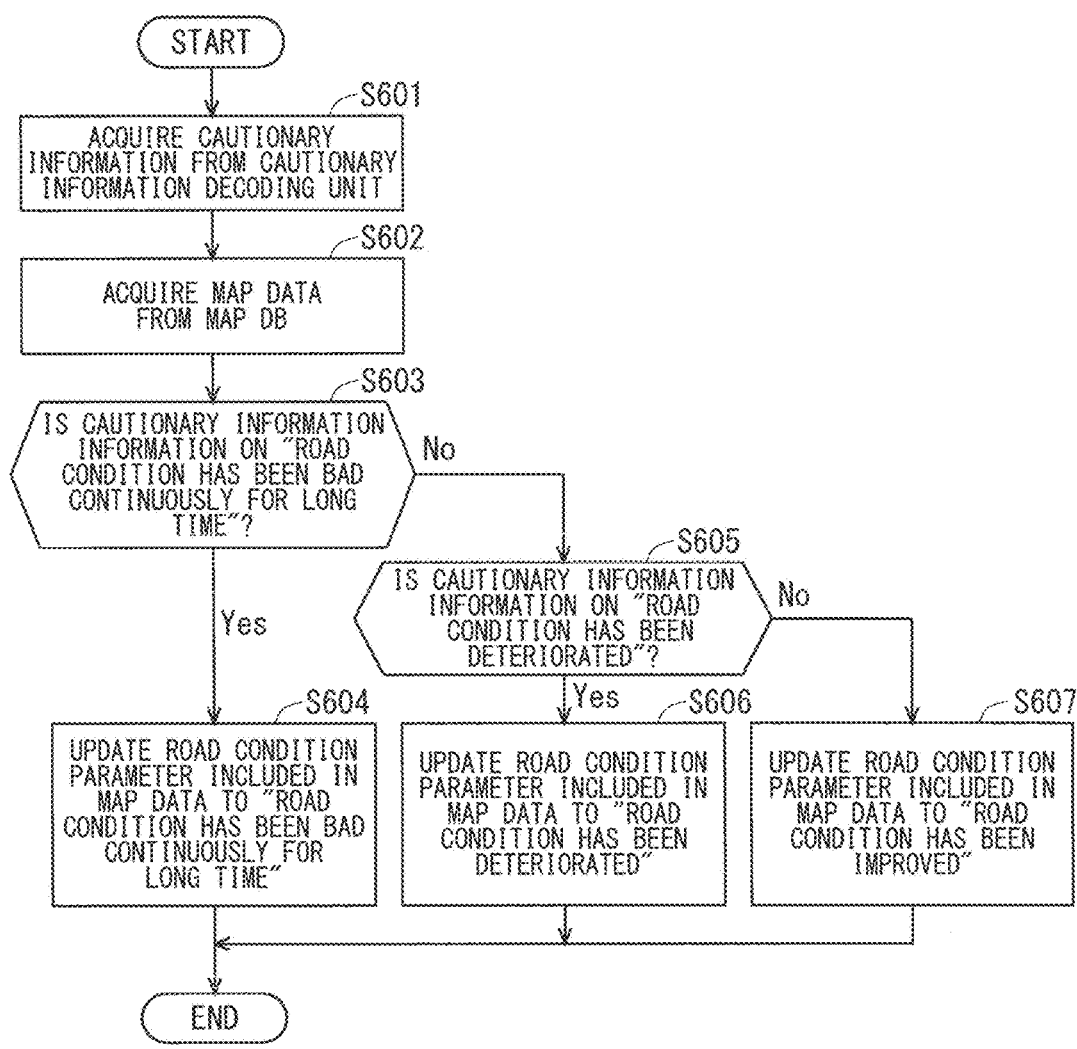
FIG. 18 is a flowchart showing an exemplary operation of a map data updating unit in accordance with the first preferred embodiment of the present invention.

FIG. 18 is a flowchart showing an operation of the map data updating unit 22, which shows a detailed operation in Step S503 of FIG. 17.

In Step S601, the map data updating unit 22 acquires the cautionary information from the cautionary information decoding unit 21.

In Step S602, the map data updating unit 22 acquires road data corresponding to the target road section included in the cautionary information, from the map DB 29 through the map data input/output unit 24.

In Step S603, the map data updating unit 22 determines whether or not the cautionary information is information on "the road condition has been bad continuously for a long time". When the cautionary information is the information on "the road condition has been bad continuously for a long time", the process goes to Step S604. On the other hand, when the cautionary information is not the information on "the road condition has been bad continuously for a long time", the process goes to Step S605.

In Step S604, the map data updating unit 22 updates the road condition parameter included in the map data to "the road condition has been bad continuously for a long time" and then stores the road condition parameter into the map DB 29.

In Step S605, the map data updating unit 22 determines whether or not the cautionary information is information on "the road condition has been deteriorated". When the cautionary information is the information on "the road condition has been deteriorated", the process goes to Step S606. On the other hand, when the cautionary information is not the information on "the road condition has been deteriorated", the map data updating unit 22 determines that the cautionary information is information on "the road condition has been improved", and the process goes to Step S607.

In Step S606, the map data updating unit 22 updates the road condition parameter included in the map data to "the road condition has been deteriorated" and then stores the road condition parameter into the map DB 29.

In Step S607, the map data updating unit 22 updates the road condition parameter included in the map data to "the road condition has been improved" and then stores the road condition parameter into the map DB 29.

FIG. 19 is a flowchart showing an operation of the vehicle property updating unit 23, which shows a detailed operation in Step S504 of FIG. 17.

In Step S701, the vehicle property updating unit 23 acquires the cautionary information from the cautionary information decoding unit 21.

In Step S702, the vehicle property updating unit 23 acquires the road data corresponding to the target road section included in the cautionary information, from the map DB 29 through the map data input/output unit 24.

In Step S703, the vehicle property updating unit 23 determines whether or not the cautionary information is information on "the own vehicle has a possibility of failure". When the cautionary information is the information on "the own vehicle has a possibility of failure", the process goes to Step S704. On the other hand, when the cautionary information is not the information on "the own vehicle has a possibility of failure", the process goes to Step S705.

In Step S704, the vehicle property updating unit 23 updates the own vehicle parameter included in the map data to "the own vehicle has a possibility of failure" and then stores the own vehicle parameter into the map DB 29.

In Step S705, the vehicle property updating unit 23 determines whether or not the cautionary information is information on "the driving skill of the driver of the own vehicle is low". When the cautionary information is the information on "the driving skill of the driver of the own vehicle is low", the process goes to Step S706. On the other hand, when the cautionary information is not the information on "the driving skill of the driver of the own vehicle is low", the process goes to Step S707.

In Step S706, the vehicle property updating unit 23 updates the own vehicle parameter included in the map data to "the driving skill of the driver of the own vehicle is low" and then stores the own vehicle parameter into the map DB 29.

In Step S707, the vehicle property updating unit 23 updates the own vehicle parameter included in the map data to "the driving skill of the driver of the own vehicle has been improved" and then stores the own vehicle parameter into the map DB 29.

FIG. 20 is a flowchart showing an exemplary operation of the output controller 25.

In Step S801, the output controller 25 acquires the map data from the map DB 29 through the map data input/output unit 24. Specifically, the output controller 25 acquires the road data corresponding to the target road section which the vehicle will travel after this time, for example, on the basis of current position information of the vehicle, which is acquired by the GPS 31. At that time, the road data includes the road condition parameter and the own vehicle parameter.

In Step S802, the output controller 25 determines whether or not the own vehicle parameter included in the map data indicates that "the own vehicle has a possibility of failure". When the own vehicle parameter indicates that "the own vehicle has a possibility of failure", the process goes to Step S803. On the other hand, when the own vehicle parameter does not indicate that "the own vehicle has a possibility of failure", the process goes to Step S804.

Figure 21:
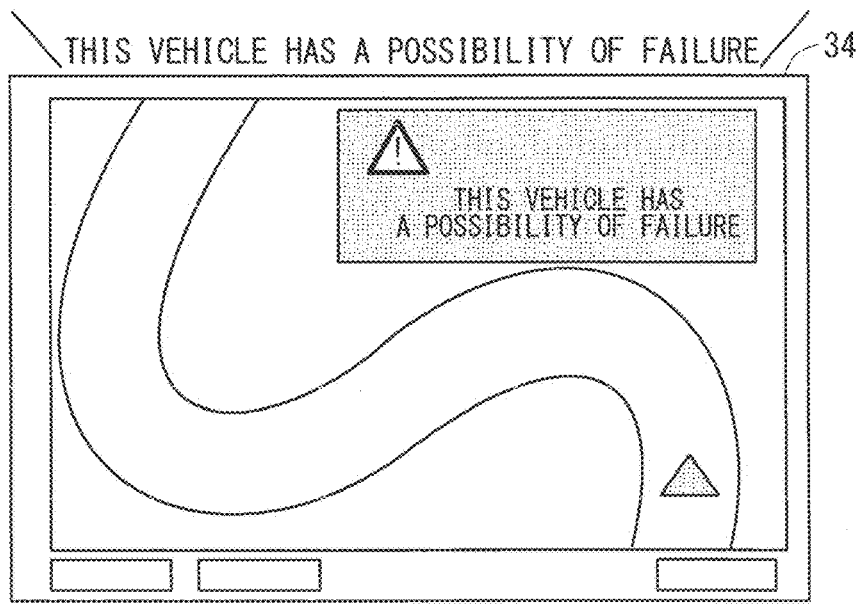
FIG. 21 is a view showing an exemplary "cautioning" in accordance with the first preferred embodiment of the present invention.

In Step S803, the output controller 25 controls the display 34 and the speaker 35 to output the information on "the own vehicle has a possibility of failure" via the output interface 28. Specifically, for example, as shown in FIG. 21, the output controller 25 displays "This vehicle has a possibility of failure" on the display 34 and outputs voice speaking that "this vehicle has a possibility of failure" from the speaker 35. Further, in FIG. 21, the triangle mark indicates a current position of the own vehicle.

In Step S804, the output controller 25 determines whether or not the own vehicle parameter included in the map data indicates that "the driving skill of the driver of the own vehicle has been improved". When the own vehicle parameter indicates that "the driving skill of the driver of the own vehicle has been improved", the process goes to Step S805. On the other hand, when the own vehicle parameter does not indicate that "the driving skill of the driver of the own vehicle has been improved", the process goes to Step S806.

Figure 22:
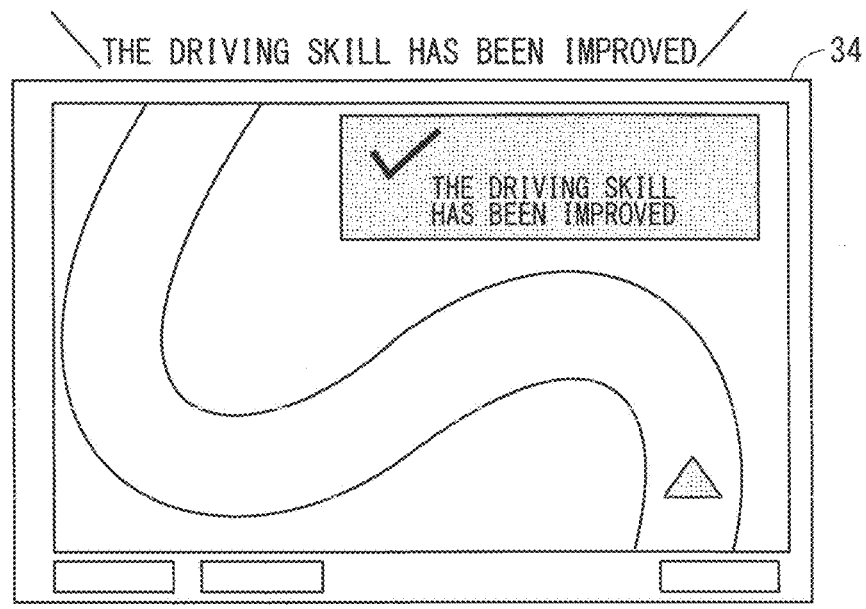
FIG. 22 is a view showing another exemplary "cautioning" in accordance with the first preferred embodiment of the present invention.

In Step S805, the output controller 25 controls the display 34 and the speaker 35 to output the information on "the driving skill of the driver of the own vehicle has been improved" via the output interface 28. Specifically, for example, as shown in FIG. 22, the output controller 25 displays "The driving skill has been improved" on the display 34 and outputs voice speaking that "the driving skill has been improved" from the speaker 35. Further, in FIG. 22, the triangle mark indicates a current position of the own vehicle.

In Step S806, the output controller 25 determines whether or not the own vehicle parameter included in the map data indicates that "the driving skill of the driver of the own vehicle is low". When the own vehicle parameter indicates that "the driving skill of the driver of the own vehicle is low", the process goes to Step S807. On the other hand, when the own vehicle parameter does not indicate that "the driving skill of the driver of the own vehicle is low", the process goes to Step S808.

Figure 23:
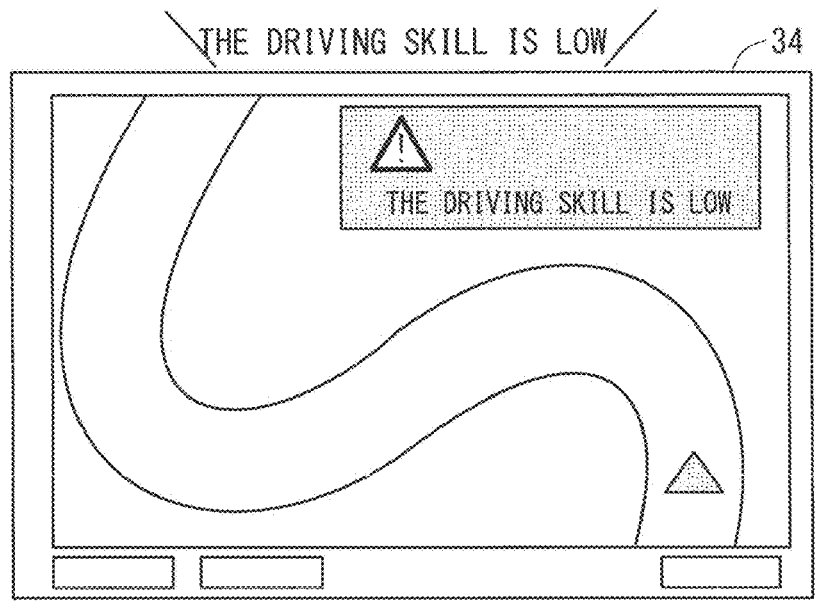
FIG. 23 is a view showing still another exemplary "cautioning" in accordance with the first preferred embodiment of the present invention.

In Step S807, the output controller 25 controls the display 34 and the speaker 35 to output the information on "the driving skill of the driver of the own vehicle is low" via the output interface 28. Specifically, for example, as shown in FIG. 23, the output controller 25 displays "The driving skill is low" on the display 34 and outputs voice speaking that "the driving skill is low" from the speaker 35. Further, in FIG. 23, the triangle mark indicates a current position of the own vehicle.

In Step S808, the output controller 25 determines whether or not the road condition parameter included in the map data indicates that "the road condition has been bad continuously for a long time". When the road condition parameter indicates that "the road condition has been bad continuously for a long time", the process goes to Step S809. On the other hand, when the road condition parameter does not indicate that "the road condition has been bad continuously for a long time", the process goes to Step S810.

Figure 24:
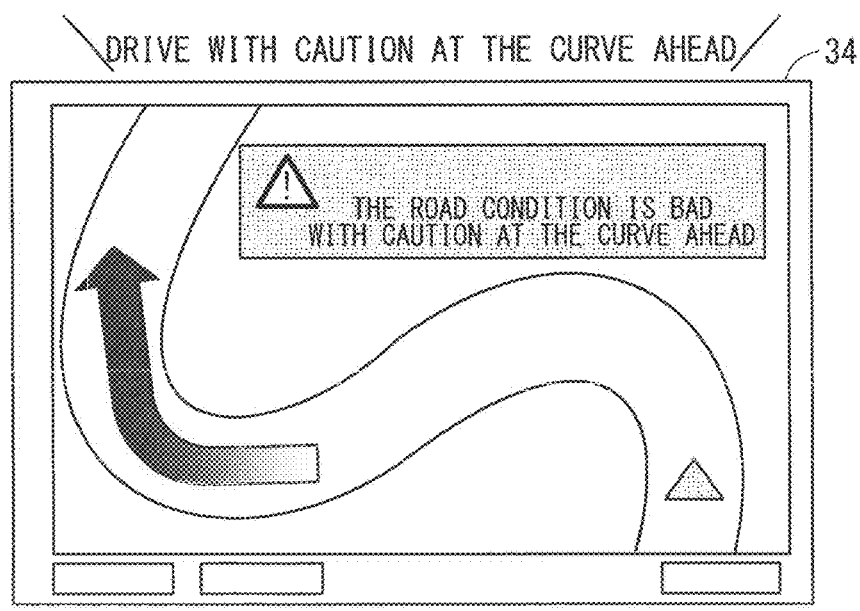
FIG. 24 is a view showing yet another exemplary "cautioning" in accordance with the first preferred embodiment of the present invention.

In Step S809, the output controller 25 controls the display 34 and the speaker 35 to output the information on "the road condition has been bad continuously for a long time" via the output interface 28. Specifically, for example, as shown in FIG. 24, the output controller 25 displays "The road condition is bad. With caution at the curve ahead" on the display 34 and outputs voice speaking that "please drive with caution at the curve ahead" from the speaker 35. Further, the output controller 25 displays an arrow at a portion in the curve which requires caution. The portion where the arrow is displayed can be realized, for example, by including information of a portion in which there is a large variation in the traveling locus into the cautionary information. Furthermore, in displaying the arrow, a portion in which there is a particularly large variation (a portion in which the road condition is particularly bad) may be accentuated by using a different color. Though the arrow is displayed at the portion which requires caution in FIG. 24, this is only one exemplary case. There may be a case, for example, where a heavy line is displayed at the portion which requires caution or a road section which requires caution is filled solid. Further, in FIG. 24, the triangle mark indicates a current position of the own vehicle.

In Step S810, the output controller 25 determines whether or not the road condition parameter included in the map data indicates that "the road condition has been deteriorated". When the road condition parameter indicates that "the road condition has been deteriorated", the process goes to Step S811. On the other hand, when the road condition parameter does not indicate that "the road condition has been deteriorated", the process goes to Step S812.

Figure 25:
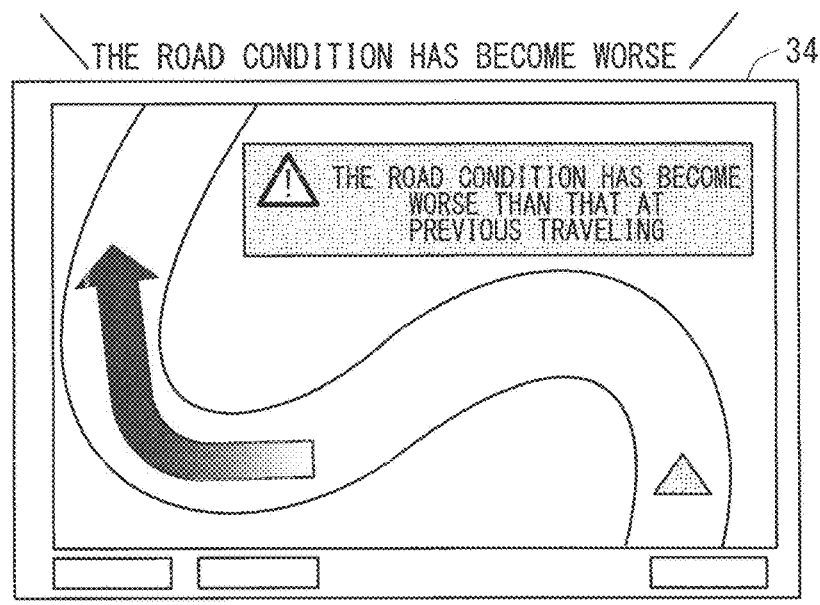
FIG. 25 is a view showing further exemplary "cautioning" in accordance with the first preferred embodiment of the present invention.

In Step S811, the output controller 25 controls the display 34 and the speaker 35 to output the information on "the road condition has been deteriorated" via the output interface 28. Specifically, for example, as shown in FIG. 25, the output controller 25 displays "The road condition has become worse than that at previous traveling" on the display 34 and outputs voice speaking that "the road condition has become worse" from the speaker 35. Further, the output controller 25 displays an arrow at a portion in the curve which requires caution. Furthermore, in displaying the arrow, a portion in which there is a particularly large variation (a portion in which the road condition is particularly bad) may be accentuated by using a different color. Though the arrow is displayed at the portion which requires caution in FIG. 25, this is only one exemplary case. There may be a case, for example, where a heavy line is displayed at the portion which requires caution or a road section which requires caution is filled solid. Further, in FIG. 25, the triangle mark indicates a current position of the own vehicle.

Figure 26:
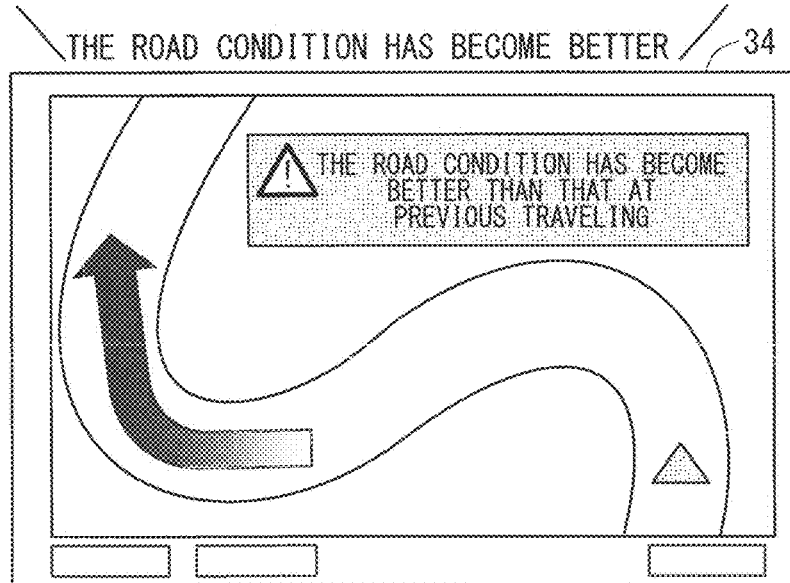
FIG. 26 is a view showing still further exemplary "cautioning" in accordance with the first preferred embodiment of the present invention.

In Step S812, the output controller 25 determines that the road condition parameter included in the map data indicates that "the road condition has been improved", and controls the display 34 and the speaker 35 to output the information on "the road condition has been improved" via the output interface 28. Specifically, for example, as shown in FIG. 26, the output controller 25 displays "The road condition has become better than that at previous traveling" on the display 34 and outputs voice speaking that "the road condition has become better" from the speaker 35. Further, the output controller 25 displays an arrow at a portion in the curve where the road condition has been particularly improved. Though the arrow is displayed at the portion where the road condition has been improved in FIG. 26, this is only one exemplary case. There may be a case, for example, where a heavy line is displayed at the portion where the road condition has been improved or a road section where the road condition has been improved is filled solid. Further, in FIG. 26, the triangle mark indicates a current position of the own vehicle.

Further, the operation shown in FIG. 20 is performed before the vehicle travels the target road section. For example, the output controller 25 determines whether to perform the operation of FIG. 20 on the basis of road information such as a radius of curvature of a curve included in the map data, and the like. Furthermore, as another example, the output controller 25 determines whether to perform the operation of FIG. 20 on the basis of a speed of the vehicle entering the target road section.

In FIGS. 21 to 23, the triangle mark indicating the current position of the own vehicle may be changed in accordance with the own vehicle parameter ("the own vehicle has a possibility of failure", "the driving skill of the driver of the own vehicle has been improved", or "the driving skill of the driver of the own vehicle is low"). For example, the color of the triangle mark may be changed, the shape of the mark may be changed into any shape other than triangle, the triangle mark may be blinked, or these methods may be combined.

Though the case has been described above where the information is outputted from the display 34 and the speaker 35, this is only one exemplary case, and the information may be outputted from at least one of the display 34 and the speaker 35.

Thus, according to the first preferred embodiment, it is possible to present effective caution information to the driver at an appropriate timing in a case where the vehicle travels a road section (target road section) in which an increase of driving load is expected, such as a curve, a steep slope, or the like.

<The Second Preferred Embodiment>

Figure 27:
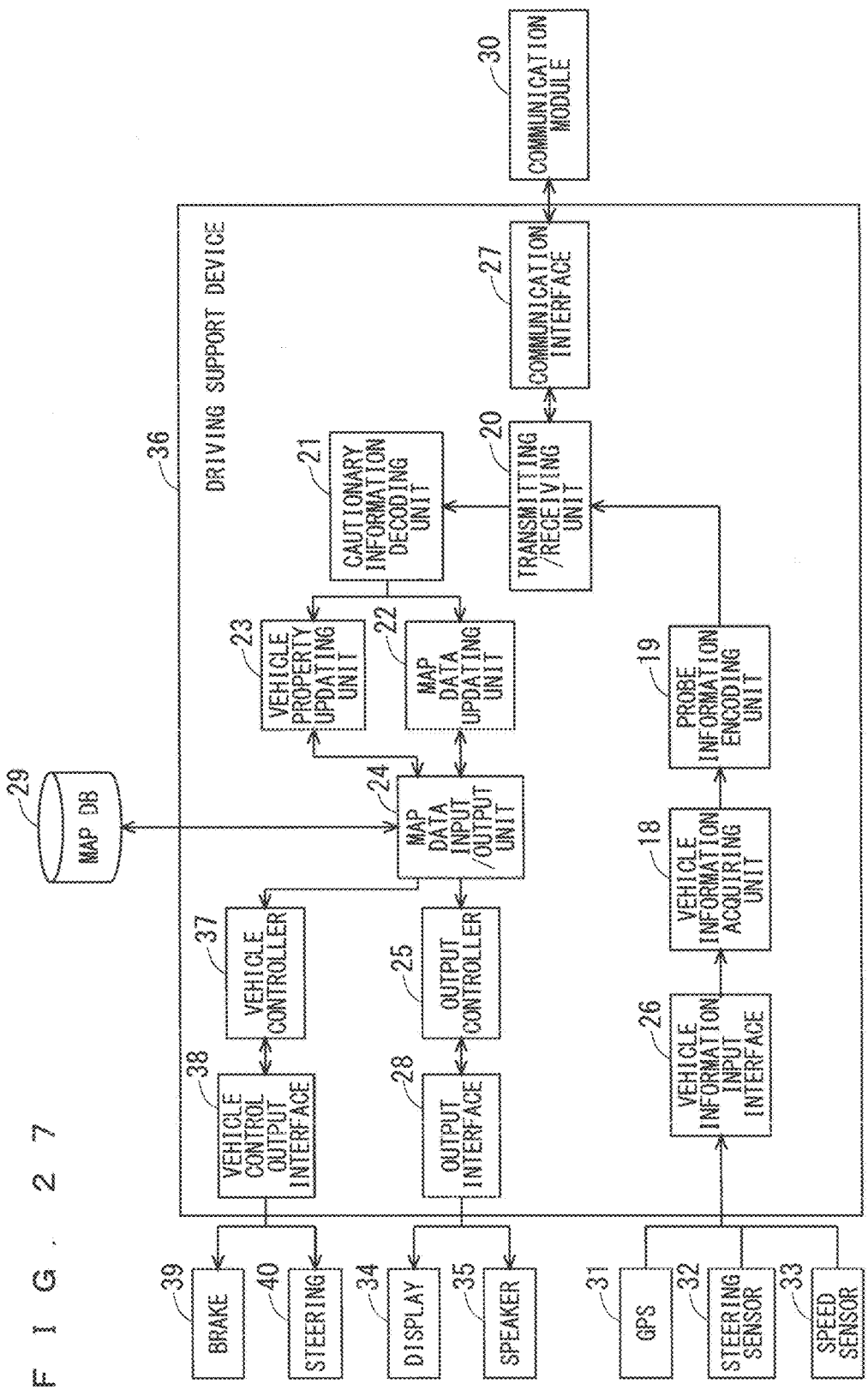
FIG. 27 is a block diagram showing an exemplary constitution of a driving support device in accordance with a second preferred embodiment of the present invention.

FIG. 27 is a block diagram showing an exemplary constitution of a driving support device 36 in accordance with the second preferred embodiment of the present invention.

As shown in FIG. 27, the driving support device 36 further comprises a vehicle controller 37 and a vehicle control output interface 38. The vehicle controller 37 is connected to each of a brake 39 and a steering 40 via the vehicle control output interface 38. Since the constitution and the operation of the driving support device 36 other than the above are identical to those in the first preferred embodiment (see FIG. 15), any detailed description will be omitted herein.

The vehicle controller 37 controls at least one of the brake 39 and the steering 40 on the basis of the road condition parameter or the own vehicle parameter included in the map data stored in the map DB 29. Specifically, the vehicle controller 37 controls the traveling of the vehicle. Hereinafter, a specific example of the control performed by the vehicle controller 37 will be described.

When the own vehicle parameter included in the map data indicates that "the driving skill of the driver of the own vehicle is low", the vehicle controller 37 controls the deceleration of the brake 39 earlier than usual in the target road section. Further, the vehicle controller 37 may keep the interval between the own vehicle and a car ahead thereof constant by controlling the brake 39. When the own vehicle parameter included in the map data indicates that "the own vehicle has a possibility of failure", the vehicle controller 37 controls the steering 40. Specifically, when the vehicle causes the shimmy phenomenon, the vehicle controller 37 controls the steering 40 in order to cancel the shimmy phenomenon. Further, the vehicle controller 37 may control the deceleration of the brake 39. When the own vehicle parameter included in the map data indicates that "the driving skill of the driver of the own vehicle has been improved", the vehicle controller 37 controls the deceleration of the brake 39 as usual in the target road section.

When the road condition parameter included in the map data indicates that "the road condition has been bad continuously for a long time", the vehicle controller 37 controls the deceleration of the brake 39 in the target road section. When the road condition parameter included in the map data indicates that "the road condition has been deteriorated", the vehicle controller 37 controls the deceleration of the brake 39 in the target road section. When the road condition parameter included in the map data indicates that "the road condition has been improved", the vehicle controller 37 controls the deceleration of the brake 39 as usual in the target road section.

Thus, according to the second preferred embodiment, it is possible to present effective caution information to the driver at an appropriate timing in a case where the vehicle travels the target road section and also to perform assistance of driving operation.

<The Third Preferred Embodiment>

Figure 28:
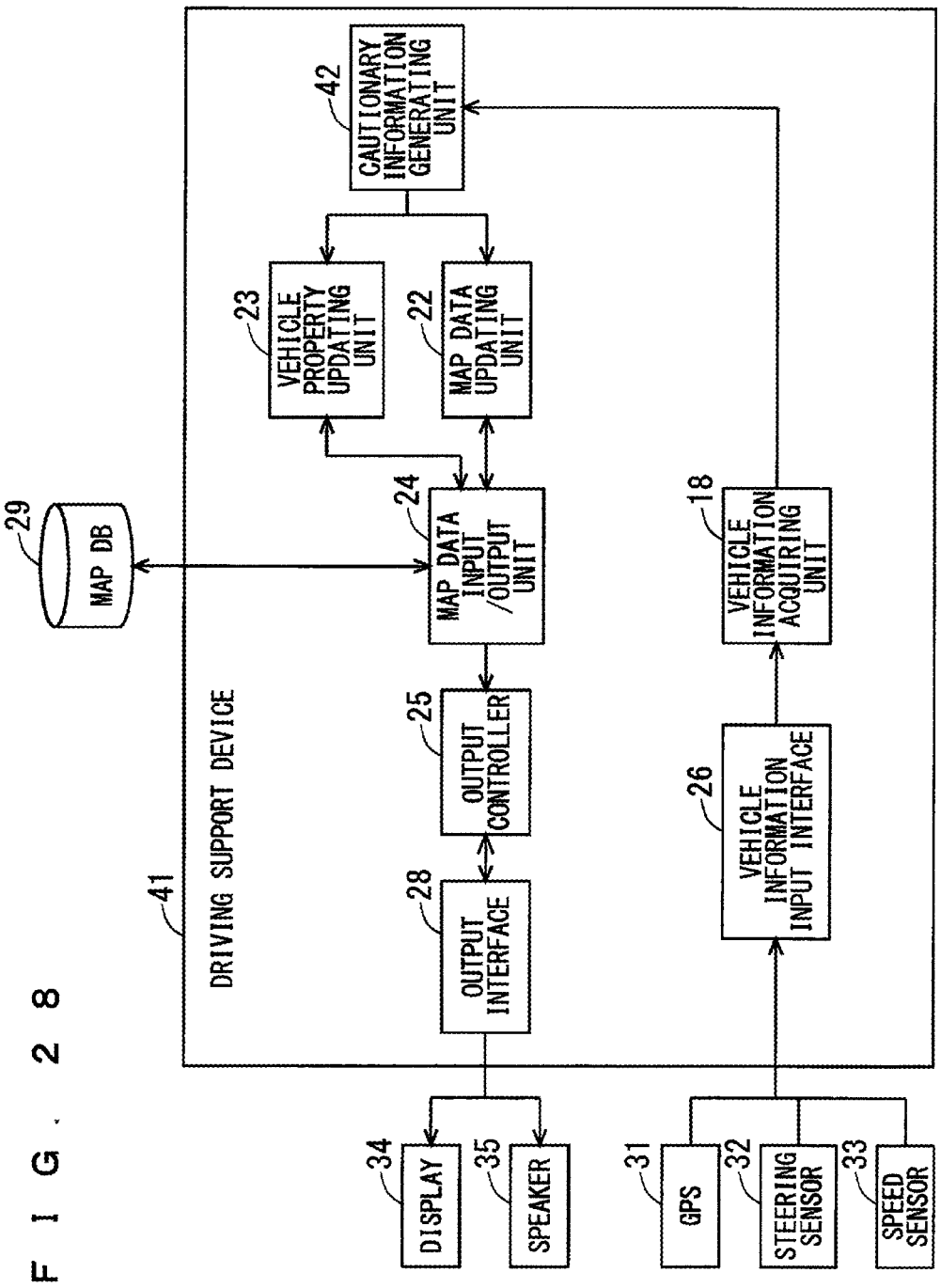
FIG. 28 is a block diagram showing an exemplary constitution of a driving support device in accordance with a third preferred embodiment of the present invention.

FIG. 28 is a block diagram showing an exemplary constitution of a driving support device 41 in accordance with the third preferred embodiment of the present invention.

As shown in FIG. 28, the driving support device 41 further comprises a cautionary information generating unit 42. More specifically, the driving support device 41 comprises the cautionary information generating unit 3 in the driving support information generation device 6 (see FIG. 3) of the first preferred embodiment, instead of the probe information encoding unit 19, the transmitting/receiving unit 20, the cautionary information decoding unit 21, and the communication interface 27 in the driving support device 17 (see FIG. 15) of the first preferred embodiment. In other words, the driving support device 41 is a single device in which the respective functions of the driving support device 17 and the driving support information generation device 6 are implemented. Since the constitution and the operation of the driving support device 41 other than the above are identical to those in the first preferred embodiment (see FIG. 15), any detailed description will be omitted herein.

The cautionary information generating unit 42 generates the cautionary information on the basis of the vehicle information acquired by the vehicle information acquiring unit 18. Further, the operation of generating the cautionary information which is performed by the cautionary information generating unit 42 is identical to that performed by the cautionary information generating unit 3 in the first preferred embodiment. Since the driving support device 41 cannot receive the probe information from any other vehicle, however, the driving support device 41 cannot generate cautionary information which is generated by using the probe information of the other vehicle, such as the cautionary information on the road condition. Therefore, only the own vehicle parameter included in the map data is stored into the map DB 29.

Thus, according to the third preferred embodiment, it is possible to generate the cautionary information even when the driving support device 41 mounted on the vehicle has no function of transmitting the probe information to the outside (the driving support information generation device 6 in the first preferred embodiment).

Further, in the third preferred embodiment, the driving support device 41 may further comprise the vehicle controller 37 and the vehicle control output interface 38 which are provided in the driving support device 36 (see FIG. 27) of the second preferred embodiment. In this case, additionally to the effect of the third preferred embodiment, the effect of the second preferred embodiment can be also produced.

<The Fourth Preferred Embodiment>

In the fourth preferred embodiment of the present invention, the vehicle has a plurality of sensors. Since the constitution and the operation other than the above are identical to those in the first or third preferred embodiment, any detailed description will be omitted herein. Further, it is assumed, in the following description, that the driving support device is the driving support device 17 of the first preferred embodiment and the driving support information generation device is the driving support information generation device 6 of the first preferred embodiment.

In the fourth preferred embodiment, the vehicle comprises, for example, an ultrasonic sensor, an image sensor, an acceleration sensor, and a sensor for detecting a reverse signal.

The ultrasonic sensor can detect projections and depressions of the road surface. Information on the projections and depressions of the road surface detected by the ultrasonic sensor, is included into the probe information and transmitted to the driving support information generation device 6. The driving support information generation device 6 causes the received information on the projections and depressions of the road surface to be included into the probe data and stored into the map DB 14. The cautionary information generating unit 3 generates the cautionary information on the basis of the information on the projections and depressions of the road surface, which is included in the probe data. The cautionary information generating unit 3 can thereby determine on the road condition in the target road section, whether or not there is a trouble in the shape of the road or whether or not there is a trouble in the projections and depressions of the road surface (whether or not the road surface condition is bad).

The image sensor can detect the projections and depressions of the road surface or the road surface condition in accordance with the weather. Information on each condition detected by the image sensor, is included into the probe information and transmitted to the driving support information generation device 6. The driving support information generation device 6 causes the received information on each condition to be included into the probe data and stored into the map DB 14. The cautionary information generating unit 3 generates the cautionary information on the basis of the information on each condition, which is included in the probe data. The cautionary information generating unit 3 can thereby determine on the road condition in the target road section, whether or not there is a trouble in the shape of the road or whether or not there is a trouble in the projections and depressions of the road surface. Further, the cautionary information generating unit 3 can determine whether or not there is a trouble in the road surface condition, which is influenced by the weather.

The acceleration sensor can detect respective accelerations in an x-axis direction, a y-axis direction, and a z-axis direction with respect to the vehicle. Information on the accelerations detected by the acceleration sensor is included into the probe information and transmitted to the driving support information generation device 6. The driving support information generation device 6 causes the received information on the accelerations to be included into the probe data and stored into the map DB 14. The cautionary information generating unit 3 generates the cautionary information on the basis of the information on the accelerations, which is included in the probe data. The cautionary information generating unit 3 can thereby determine, on the basis of the acceleration in the x-axis direction, whether or not the vehicle frequently repeats acceleration and deceleration in the target road section. Further, the cautionary information generating unit 3 can determine, on the basis of the acceleration in the y-axis direction, whether or not the vehicle goes into a skid in the target road section (whether or not the road conditions is bad). Furthermore, the cautionary information generating unit 3 can determine, on the basis of the acceleration in the z-axis direction, whether or not the vehicle vertically vibrates in the target road section (whether or not there is a trouble in the projections and depressions of the road surface).

The sensor for detecting a reverse signal can detect forward or backward movement of the vehicle. Information (hereinafter, also referred to as "forward-and-backward movement information") on the forward or backward movement of the vehicle, which is detected by the sensor for detecting a reverse signal, is included into the probe information and transmitted to the driving support information generation device 6. The driving support information generation device 6 causes the received forward-and-backward movement information to be included into the probe data and stored into the map DB 14. The cautionary information generating unit 3 generates the cautionary information on the basis of the forward-and-backward movement information included in the probe data. The cautionary information generating unit 3 can thereby determine whether or not the vehicle repeats the forward and backward movements in the target road section.

FIG. 29 is a view showing an example of probe data in accordance with the fourth preferred embodiment of the present invention.

As shown in FIG. 29, the probe data of the fourth preferred embodiment includes the information on the accelerations, the information on the reverse signal, and the information on road surface condition, which are described above.

Thus, according to the fourth preferred embodiment, the cautionary information generating unit 3 can generate more accurate (more detailed) cautionary information. Further, the driving support device 17 can present more accurate information to the driver.

Description has been made above on the case where a system is constructed by combining the driving support device, the driving support information generation device, and the mobile communication terminal (e.g., a cellular phone, a smartphone, a tablet, and the like) as appropriate. In this case, the respective functions or constituent elements of the driving support device and the driving support information generation device are arranged dispersedly in the functions constituting the above system.

Figure 30:
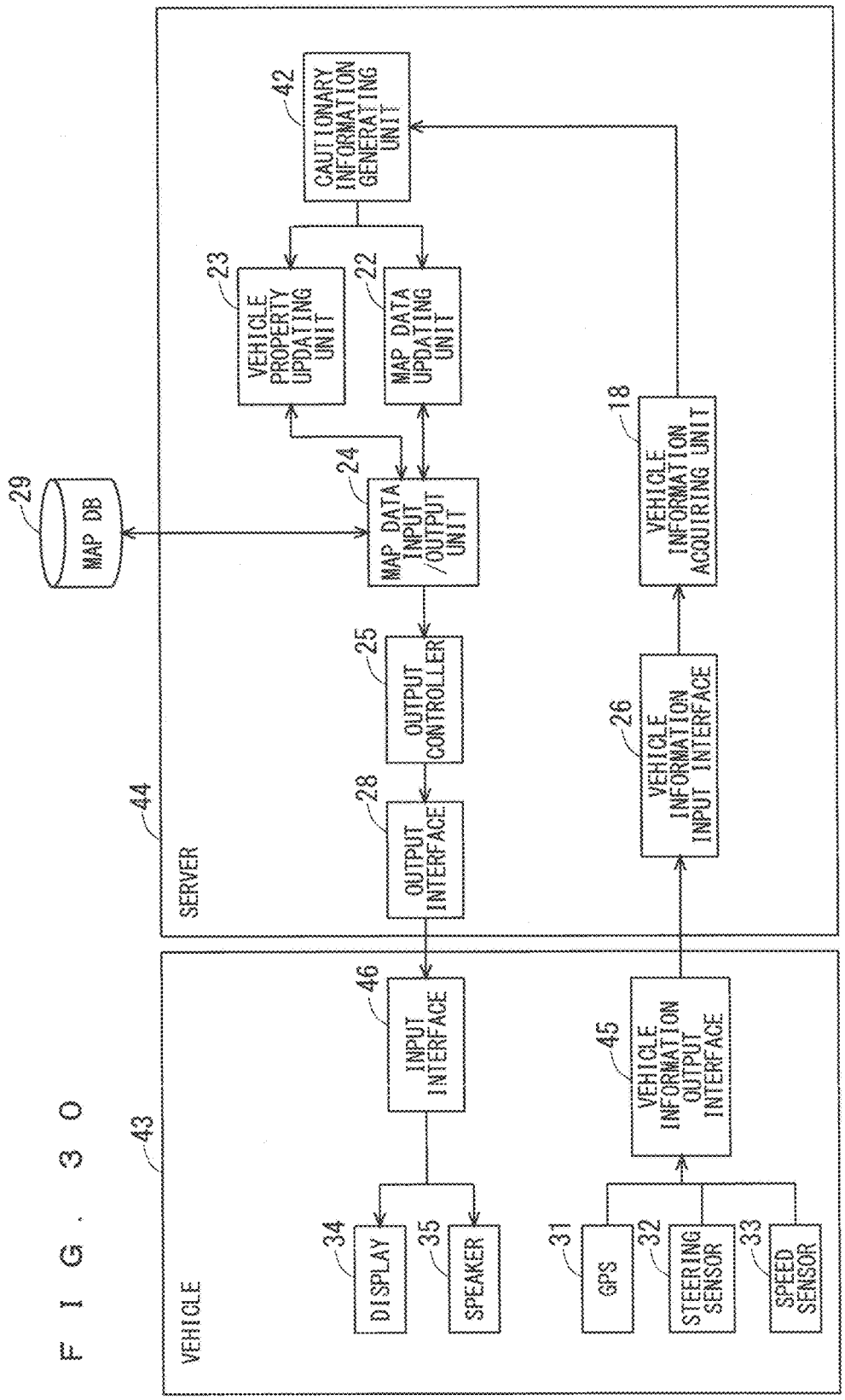
FIG. 30 is a block diagram showing an exemplary constitution of a driving support system in accordance with the preferred embodiments of the present invention.

Specifically, as an example, the respective functions of the driving support device and the driving support information generation device can be arranged in a server. As shown in FIG. 30, for example, a driving support system can be constructed by providing a vehicle information output interface 45 and an input interface 46, additionally to a GPS 31, a steering sensor 32, a speed sensor 33, a display 34, and a speaker 35 which have the same functions as those of the GPS 31, the steering sensor 32, the speed sensor 33, the display 34, and the speaker 35, respectively, shown in FIG. 28, in a vehicle 43 on a user side and providing constituent elements which have the same functions as those of the constituent elements in the driving support device 36 shown in FIG. 28 in a server 44. Further, the constituent elements provided in the server 44 may be arranged dispersedly in the server 44 and the vehicle 43 as appropriate. Furthermore, the same applies to the respective constituent elements shown in FIGS. 3, 15, and 27.

Further, as another example, the respective functions of the driving support device and the driving support information generation device can be arranged in the server and the mobile communication terminal. As shown in FIG. 31, for example, a driving support system can be constructed by providing the vehicle information output interface 45 and the input interface 46, additionally to a GPS 31, a steering sensor 32, a speed sensor 33, a display 34, and a speaker 35 which have the same functions as those of the GPS 31, the steering sensor 32, the speed sensor 33, the display 34, and the speaker 35, respectively, shown in FIG. 28, in the vehicle 43 on a user side, providing a map data output interface 49 additionally to the vehicle information acquiring unit 18, the map data updating unit 22, the vehicle property updating unit 23, the map data input/output unit 24, the vehicle information input interface 26, and the cautionary information generating unit 42 shown in FIG. 28 in a server 48, and providing a map data input interface 50 additionally to the output controller 25 and the output interface 28 shown in FIG. 28 in a mobile communication terminal 47. Further, the constituent elements provided in the server 48 and the mobile communication terminal 47 may be arranged dispersedly in the vehicle 43, the server 48, and the mobile communication terminal 47 as appropriate. Furthermore, the same applies to the respective constituent elements shown in FIGS. 3, 15, and 27.

Even in the case of adopting the above constitution, the same effect as those in the above-described preferred embodiments can be produced.

Further, the software (the driving support information generation method and the driving support method) for performing operations in the above-described preferred embodiments may be incorporated in, for example, the server or the mobile communication terminal.

Specifically, as an example, the above-described driving support information generation method comprises the steps of collecting the vehicle information including the traveling locus information indicating a traveling locus of a vehicle which travels a predetermined road section and generating the cautionary information which is information to require a driver of the vehicle to exercise caution when the vehicle travels the section, on the basis of the vehicle information collected. Further, the driving support method comprises the steps of acquiring the cautionary information generated by the driving support information generation method and making cautioning to the driver of the vehicle on the basis of the cautionary information acquired.

Thus, by operating the software for performing the operations in the above-described preferred embodiments, which is incorporated in the server and/or the mobile communication terminal, the same effects as those in the above-described preferred embodiments can be produced.

Further, in FIGS. 1, 3, 15, 27, 28, 30, and 31, the cautionary information generating unit 3, the transmitting/receiving unit 7, the probe information decoding unit 8, the map data acquiring unit 9, the probe data acquiring unit 10, the DB information input/output unit 11, the cautionary information encoding unit 12, the vehicle information acquiring unit 18, the probe information encoding unit 19, the transmitting/receiving unit 20, the cautionary information decoding unit 21, the map data updating unit 22, the vehicle property updating unit 23, the map data input/output unit 24, the output controller 25, the vehicle controller 37, and the cautionary information generating unit 42 are each implemented by operating the processor 4 of FIG. 2 in accordance with the software program stored in the memory 5 or the like. Instead, however, the cautionary information generating unit 3, the transmitting/receiving unit 7, the probe information decoding unit 8, the map data acquiring unit 9, the probe data acquiring unit 10, the DB information input/output unit 11, the cautionary information encoding unit 12, the vehicle information acquiring unit 18, the probe information encoding unit 19, the transmitting/receiving unit 20, the cautionary information decoding unit 21, the map data updating unit 22, the vehicle property updating unit 23, the map data input/output unit 24, the output controller 25, the vehicle controller 37, and the cautionary information generating unit 42 may be each formed as a hardware element (for example, an arithmetic/processing circuit or the like which is formed to perform a specific arithmetic operation or processing with respect to an electrical signal). Furthermore, the above constituent elements implemented by software and those implemented by hardware may be mixed.

As a concept for each of respective combinations of the cautionary information generating unit 3, the transmitting/receiving unit 7, the probe information decoding unit 8, the map data acquiring unit 9, the probe data acquiring unit 10, the DB information input/output unit 11, the cautionary information encoding unit 12, the vehicle information acquiring unit 18, the probe information encoding unit 19, the transmitting/receiving unit 20, the cautionary information decoding unit 21, the map data updating unit 22, the vehicle property updating unit 23, the map data input/output unit 24, the output controller 25, the vehicle controller 37, and the cautionary information generating unit 42 which are implemented by software and the cautionary information generating unit 3, the transmitting/receiving unit 7, the probe information decoding unit 8, the map data acquiring unit 9, the probe data acquiring unit 10, the DB information input/output unit 11, the cautionary information encoding unit 12, the vehicle information acquiring unit 18, the probe information encoding unit 19, the transmitting/receiving unit 20, the cautionary information decoding unit 21, the map data updating unit 22, the vehicle property updating unit 23, the map data input/output unit 24, the output controller 25, the vehicle controller 37, and the cautionary information generating unit 42 which are implemented by hardware, instead of the word "unit", the word "processing circuit" may be used.

In the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 1 driving support information generation device, 2 vehicle information collecting unit, 3 cautionary information generating unit, 4 processor, 5 memory, 6 driving support information generation device, 7 transmitting/receiving unit, 8 probe information decoding unit, 9 map data acquiring unit, 10 probe data acquiring unit, 11 DB information input/output unit, 12 cautionary information encoding unit, 13 communication interface, 14 map DB, 15 probe DB, 16 communication module, 17 driving support device, 18 vehicle information acquiring unit, 19 probe information encoding unit, 20 transmitting/receiving unit, 21 cautionary information decoding unit, 22 map data updating unit, 23 vehicle property updating unit, 24 map data input/output unit, 25 output controller, 26 vehicle information input interface, 27 communication interface, 28 output interface, 29 map DB, 30 communication module, 31 GPS, 32 steering sensor, 33 speed sensor, 34 display, 35 speaker, 36 driving support device, 37 vehicle controller, 38 vehicle control output interface, 39 brake, 40 steering, 41 driving support device, 42 cautionary information generating unit, 43 vehicle, 44 server, 45 vehicle information output interface, 46 input interface, 47 mobile communication terminal, 48 server, 49 map data output interface, 50 map data input interface

The invention claimed is:

1. A driving support information generation device comprising:
  a processor to execute a program; and
  a memory to store the program which, when executed by the processor, performs processes of,
    collecting vehicle information including traveling locus information indicating a traveling locus of at least one vehicle which travels a predetermined road section; and
    generating cautionary information which is information to require a driver of said at least one vehicle to exercise caution when said at least one vehicle travels said section, based on said collected vehicle information, wherein
    said cautionary information is generated based on a variation in the traveling locus of said at least one vehicle.

2. The driving support information generation device according to claim 1, wherein said program further performs a process of generating a road condition of said section or a condition of said at least one vehicle as said cautionary information based on a plurality of pieces of said traveling locus information.

3. The driving support information generation device according to claim 1, wherein said program further performs a process of generating a driving skill of said at least one vehicle as said cautionary information based on a plurality of pieces of said traveling locus information.

4. The driving support information generation device according to claim 1, wherein
  said at least one vehicle is one vehicle, and
  said program further performs a process of collecting said vehicle information of said one vehicle which travels said section a plurality of times.

5. The driving support information generation device according to claim 4, wherein said program further performs a process of generating said cautionary information based on variation in said traveling locus of said one vehicle in said section.

6. The driving support information generation device according to claim 5, wherein said program further performs a process of generating said cautionary information based on a change with time of a degree of variation in said traveling locus.

7. The driving support information generation device according to claim 4, wherein
  said vehicle information includes information on acceleration of said one vehicle, and
  said program further performs a process of generating said cautionary information also based on variation in said acceleration of said one vehicle in said section.

8. The driving support information generation device according to claim 1, wherein
  said at least one vehicle is a plurality of vehicles, and
  said program further performs a process of collecting said vehicle information of each of said plurality of vehicles which travels said section a plurality of times.

9. The driving support information generation device according to claim 8, wherein said program further performs a process of generating said cautionary information based on variation in said traveling locus of said each of said plurality of vehicles in said section.

10. The driving support information generation device according to claim 9, wherein said program further performs a process of generating said cautionary information based on a change with time of a degree of variation in said traveling locus.

11. The driving support information generation device according to claim 10, wherein said program further performs a process of, in a case where said change with time of said degree of variation in said traveling locus of only one vehicle of said plurality of vehicles becomes larger, determining that said one vehicle has been deteriorated.

12. The driving support information generation device according to claim 10, wherein said program further performs a process of, in a case where said change with time of said degree of variation in said traveling locus of only one vehicle of said plurality of vehicles becomes smaller, determining that a driving skill of a driver of said one vehicle has been improved.

13. The driving support information generation device according to claim 10, wherein said program further performs a process of, in a case where said change with time of said degree of variation in said traveling locus of each of said plurality of vehicles becomes larger, determining that a road condition of said section has been deteriorated.

14. The driving support information generation device according to claim 10, wherein said program further performs a process of, in a case where said change with time of said degree of variation in said traveling locus of each of said plurality of vehicles becomes smaller, determining that a road condition of said section has been improved.

15. The driving support information generation device according to claim 8, wherein
said vehicle information includes information on acceleration of each of said plurality of vehicles, and
said program further performs a process of generating said cautionary information also based on variation in said acceleration of said each of said plurality of vehicles in said section.

16. The driving support information generation device according to claim 1, wherein
said vehicle information includes information on vehicle model of said at least one vehicle, and
said program further performs a process of collecting said vehicle information for each said vehicle model.

17. A driving support device comprising:
a processor to execute a program; and
a memory to store the program which, when executed by the processor, performs processes of,
acquiring said cautionary information from a driving support information generation device as defined in claim 1; and
making cautioning to said driver of said at least one vehicle based on said acquired cautionary information.

18. A driving support device comprising:
a processor to execute a program; and
a memory to store the program which, when executed by the processor, performs processes of,
acquiring said cautionary information from a driving support information generation device as defined in claim 1;
controlling a travel of said at least one vehicle; and
controlling said travel of said at least one vehicle based on said cautionary information.

19. A driving support information generation method comprising:
collecting vehicle information including traveling locus information indicating a traveling locus of at least one vehicle which travels a predetermined road section; and
generating cautionary information which is information to require a driver of said vehicle to exercise caution when said at least one vehicle travels said section, based on said vehicle information collected, wherein
said cautionary information is generated based on a variation in the traveling locus of said at least one vehicle.

20. A driving support method comprising:
acquiring said cautionary information generated by the driving support information generation method as defined in claim 19; and
making cautioning to said driver of said at least one vehicle based on said cautionary information acquired.

* * * * *